(12) United States Patent
Vincent

(10) Patent No.: US 9,201,671 B2
(45) Date of Patent: Dec. 1, 2015

(54) DISTRIBUTED HYBRID VIRTUAL MEDIA AND DATA COMMUNICATION SYSTEM

(76) Inventor: Shara Susannah Vincent, Hillsboro Beach, FL (US)

(*) Notice: Subject to any disclaimer, the term of this patent is extended or adjusted under 35 U.S.C. 154(b) by 508 days.

(21) Appl. No.: 13/555,096

(22) Filed: Jul. 21, 2012

(65) Prior Publication Data

US 2012/0290702 A1 Nov. 15, 2012

Related U.S. Application Data

(63) Continuation-in-part of application No. 12/636,464, filed on Dec. 11, 2009, now Pat. No. 8,706,836.

(60) Provisional application No. 61/201,809, filed on Dec. 15, 2008.

(51) Int. Cl.
| | |
|---|---|
| G06F 9/445 | (2006.01) |
| G06F 9/48 | (2006.01) |
| G06F 9/50 | (2006.01) |
| G06F 9/54 | (2006.01) |
| G06F 9/455 | (2006.01) |

(52) U.S. Cl.
CPC .......... *G06F 9/4451* (2013.01); *G06F 9/45558* (2013.01); *G06F 9/4843* (2013.01); *G06F 9/5077* (2013.01); *G06F 9/54* (2013.01); *G06F 2009/45562* (2013.01)

(58) Field of Classification Search
CPC ........................... G06F 9/45558; G06F 9/4843
USPC ....................................... 709/220, 221; 718/1
See application file for complete search history.

(56) References Cited

U.S. PATENT DOCUMENTS

| | | | | |
|---|---|---|---|---|
| 8,086,836 | B2 * | 12/2011 | Chong et al. | 713/2 |
| 8,141,075 | B1 * | 3/2012 | Chawla et al. | 718/1 |
| 8,782,637 | B2 * | 7/2014 | Khalid | 718/1 |
| 8,811,970 | B2 * | 8/2014 | Danford et al. | 455/419 |
| 8,880,580 | B2 * | 11/2014 | Simmons et al. | 709/202 |
| 2009/0249335 | A1 * | 10/2009 | Vasilevsky et al. | 718/1 |
| 2009/0249337 | A1 * | 10/2009 | Vasilevsky et al. | 718/1 |
| 2009/0307685 | A1 * | 12/2009 | Axnix et al. | 717/174 |
| 2011/0004676 | A1 * | 1/2011 | Kawato | 709/221 |

\* cited by examiner

*Primary Examiner* — Shirley Zhang

(57) ABSTRACT

Novel methods and systems for construction a distributed adaptive server computing network system. Virtual Appliance platforms of a network service server are configured on a local computer of a registered user. Machine to machine communication channels are established through the Virtual appliance platforms and the local computer of the user is enabled to function as a part of the network service server. Direct streaming communications between users are enabled.

20 Claims, 14 Drawing Sheets

| 101 User Interface | 103 Backend Master Client | 105 Reusable Master Search Engine |
|---|---|---|
| 107 Registration System Manager/Handler for Unique Profile ID(s) | 109 DB Store Build for each User Virtual Server (CI Hub) | 111 Virtual Appliance and Packager |
| 113 Master App & Smart Controller Builds | 115 All Configurations and Utilities for Virtual Server Transformations | 117 Automated Interface, GUI Templates, and Composite Appl Builds |
| | | 119 Profile Server and Mappings |

| 200 | | | |
|---|---|---|---|
| 201 Data Storage Virtual Machine Repositories | 203 Virtual Desktop | 205 Boot Loader Kernal | 207 Business-Web Services Interfaces |
| 209 Collective Intelligence Rules Based Engine | 211 Automated File Handler (Master) | 213 Appl Engine(s) | 215 Streaming Architecture |
| | 233 Integrated File Sync Engine | | |
| 217 Notification Handler | 219 Integrated Messaging and Communication Engine | 221 Metadata Generator (XML and Other) | 223 Presentation Server and Generator |
| 225 Access Manager | 227 Client Machines to Virtual Server Machine Transformations | 229 Master DB Profile Store on Virtual Disks | 231 Master Controllers |

FIG. 2

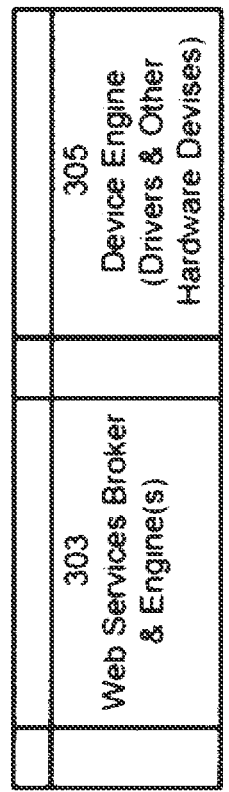
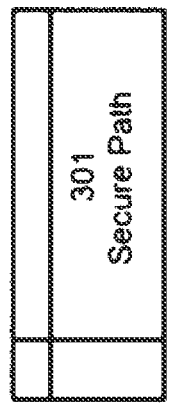
FIG. 3

DISTRIBUTED HYBRID VIRTUAL MEDIA AND DATA COMMUNICATION SYSTEM

CROSS-REFERENCE

This is a continuation-in-part Application to the U.S. application Ser. No. 12/636,464, filed on Dec. 11, 2009 now U.S. Pat. No. 8,706,836, which claims the priority of the U.S. Provisional Application No. 61/201,809 filed on Dec. 15, 2008. Priority is claimed from both Applications, and both Applications are hereby incorporated by reference.

DESCRIPTION OF RELATED ART

The present application relates to a distributed media and data electronic service system, and more particularly to a distributed hybrid virtual appliance electronic server system via direct communication channels for providing enhanced remote communication, business intelligence, energy efficiency and security.

Note that the points discussed below may reflect the hindsight gained from the disclosed inventions, and are not necessarily admitted to be prior art.

The current Internet commerce and related communication systems are mostly based on client-server model where a cluster of central server systems and backend database systems are utilized to respond to client requests from internet users. Massive internet communications are accumulating at an exponential rate on a daily basis. As more and more business, entertainment, and social activities are conducted through the Internet, the need to expand server systems have placed an increased demand for Internet related hosted services upon business and its service providers. Massive data centers need to be physically built and constructed to store the ever increasing data accumulation.

However, the cost of computing power, the fact that electrical power is no longer endlessly available, and the restriction on available physical space, have all now negated unlimited addition of new central servers as a viable solution.

Recent developments in application virtualization appliances have opened a door for providing application based services by enabling cross-platform software deployment through the internet. This application provides a hybrid system for distributed server systems by taking advantage of virtual appliance technology to seamlessly incorporate a personal computing device into its own unique I hybrid server system to create a flexible distribution of services across multiple IT domain community landscapes regardless of their system of origin.

The advantage of this invention is to provide a direct route for traditional on-premises applications to be quickly provisioned and deployed as "Service Instances" without requiring a major re-architecture for multi-tenancy. By decoupling the Operating System Infrastructure from the Application Stack, and through the enablement of Virtual Appliances, this invention will allow economies of scale that can be leveraged by not only the economy of IT simplicity, but will also reduce the cost barrier so that it becomes feasible for a domain community to host their own service solution provisioned with their own set of virtual appliance instances, modeled as templates, rather than forcing a large complex community of users to rely upon a single hosted model, as seen in today's social networking communities. The current models and service oriented technologies are not only cost prohibitive but most IT implementations have resulted in failures; especially for providing software services in the cloud or over social networking sites and communities. Another main advantage of this invention is that network and application access via its Virtual Appliance(s) will be deployed with a built-in security mechanism with all the necessary binaries to ensure user data integrity. This will become extremely and increasingly more important as greater social multimedia service communities become the norm for social collaboration to external parties and for those that expose their internal API's and libraries for application level service connections and file sharing. This invention has a built in secure path to ensure that user data remains in a secure contained environment of which a third party or current hosting service model cannot meet. Additionally, this invention is well suited for automated LAN and WAN Optimization. For example, as soon as a domain community member reaches his/her maximum capacity on his/her local personal computer, the smart physical disk block controllers deployed to each personal computing device will recognize that fact, and automatically reallocate the member's load to another available server in its community or even out to a third party provider of user choice This offsetting of a load may be to another personal computing device within his/her own community or to an external server dependent upon the sensitivity of one's data as well as the authorization and access level assigned to the domain community member. Thus, another major advantage of our underlying virtualization platform allows for rapid movements of virtual appliance instances between physical execution domain environments. In a nutshell, our invention and virtualization platform utilizes virtual appliances that quickly builds and enables a domain community and can rapidly integrate and consolidate the community's goals while simultaneously reaping faster application response time for real-time, on-demand live streaming media as the data lies locally that solves latency issues and effectively offsets the domain community's network band utilization with reduced costs associated with the administration of LAN and Wan Optimization. Thus, it is also worthy to note that software virtual appliance technologies are an excellent and cost-effective alternative for large scale applications, such as live streaming media or ones that require higher performances to achieve agility, economies of scale, while providing a solid management foundation for managed "Service Instances" across distributed global environments and domain communities.

SUMMARY

The present application discloses a novel virtualized software platform at the application (i.e. client in the context of client/server model) software level to function as part of a novel distributed computer server system for distributed computing and services via the Internet and network system.

The architecture comprises multiple technologies that enable global software emulation services across multiple platform and network communication channels, rapid data retrieval from distributed global data residing on millions of national, international, private and commercial computers, while delivering sophisticated live progressive streamed services without the need for an enormous mega data center, providing remote entertainment and live services at a substantially reduced cost to both the initiators and the providers of their services at a very environment friendly way.

The invention discovers the need for distributed live-streaming data access, and distributed server services, server network services that solves the central server problem by identifying and visualizing a fully adaptive virtualization layer over a local virtual server network site. The system includes a full set of tools to communicate over a fully virtualization application layer platform, and tools for establishing global social community networks. The system establishes an effective; state-of-the art direct communication channel between each virtual machine server to its distributed local physical machine server that offers additional network channels through networking site(s) for a complete and collaborative system.

Application or Client Level Virtualization is broadly described as technical abstraction of hardware resources so that multiple software products can uniquely share in the use of the hardware through two types of emulation without being in conflict with one another. There are four major types that fall under this category of virtualization. They have one commonality in that they all involve methods and techniques for secure isolation of an application that runs on a physical client machine that separates the application from the operating system state and its resources. The four types are application packaging virtualization, application streaming virtualization, virtual desktop infrastructure virtualization, and hardware emulation (sometimes referred to as application level hardware emulation).

Distributed Hybrid Virtual Media and Data Communication System system of this invention uniquely provides a virtual transformation software system with the combination of application packaging virtualization, application streaming virtualization, virtual desktop infrastructure virtualization. The invention implements a Hybrid Server type to replace the fourth type of Hardware Emulation.

Additionally, this system enables Learning through Observation and has a complete collective intelligence analytical hub to capture those observations for turn-key global social computational and learning modularity. This idea of the invention builds upon the concept that effective collaboration results in smarter ideas. That is, by working together, other people's knowledge can benefit everyone. Thus, this knowledge base takes advantage of real time live streaming as its enablement.

An example embodiment of the system builds a set of virtual appliances that bundle a virtual machine containing preconfigured software components unique for networking service providers on a user's physical machine disk. The virtual appliances contains new and novel instances that become an enabler of bundling software code into a single executable program for a unique automated and interactive interface for full file bundling and execution. This includes all communications to and from other virtual machines, across multiple shared virtual machine disks, and also enables the separation of the application from the underlining operating system and its hardware resources.

An example embodiment of the system includes a backend master client machine which enables a development environment for the application packaging of the domain software abstractions and instances that not only ensure the integrity of the server machines, but will generate the root file systems for the binary software images, so they properly execute the correct software image to a certain network domain pool that identifies the pool of virtual application server machine.

An example embodiment of the system implements a Model View Controller architectural pattern for the application data that are separate from the view and controller of the host machines. The presentation layer implements its own views, as mirrored instances that deliver an interface that implements the logic for processing user data and input on a locally virtual application server instance.

An example embodiment of the system includes a Distributed Hybrid Virtual Media and Data Communication System that implements its own framework with its own set of libraries, interfaces, and useful tools that can be used to build and implement dynamic applications for multimedia streaming and collective intelligence hubs. The Distributed Hybrid Virtual Media and Data Communication System transforms the physical components into a virtualized components made up of web services, networks, and business application services for performing TCP/IP related tasks as well as the utilization of many of other protocols that are server related tasks, such as interactions with its own embedded databases and other internal databases via its domain network pool. It also wraps services, such as multimedia services as a generated instance of a single executable binary.

An example embodiment of the system includes a round trip virtualization platform that provides for the direct transport and route for traditional on-premises applications to be rapidly deployed locally on a user's physical machine as a "Service Instance Model". The framework eliminates the need for huge maintenance costs now attributed for re-architecting of application services that reside in mega data centers.

In one embodiment, each network of profile users act in an internal domain community through an interconnected set of internal and external networks based upon his/her role(s), and that for each server pool, and through the use of Link Aggregation/Location Services, the user will be assigned multiple physical network interfaces for its own VLAN or Virtual Local Area Network implementation that will allow the location to define its own independent Local Area Network Services for all associated and for all those that are on a single protocol network interface. Thus, users that have multiple network interfaces can also simultaneously invoke a connection to a Virtual Private Network (VPN) or to a USB via a Cellular Network Address (think hot-wire). Thus a user can user Link Aggregation, a IEEE 802.3ad Standard, for its virtual network interfaces, use the standard IEEE802.0 standard for a VLAN, and a VPN uses the standard interface via layer 2 tunneling protocol (L2TP) over IPSEC or Internet Protocol Security.

The embodied system includes several automated interfaces captured as virtual web services allowing for full personal computing, administration, and management with round-trip virtual server deployment from a single master host server. Distributed Hybrid Virtual Media and Data Communication System—DHVMDCS.

The uniquely architecture platform may be used for the infrastructure of any social networking medium that encompasses sports, music, and entertainment domains as well as a social networking infrastructure platform for the aggregation and brokering of multimedia data.

Additionally, not only is the invention new in its architecture, protocols, and methods, but the actual software code and their corresponding containers can be reused for building other features allowing for a physical-to-virtual transformation. The result is a full blown, live streaming media and data communication hub which can be re-purposed for any business domain wanting to extend its social networking platform at a fraction of the cost to normally custom build and deploy.

The invention utilizes and takes advantage of hardware emulation through a unique hybrid virtualization instance that eliminates the need for large mega servers and storage centers associated with only the one type of server virtualization.

The invention enhances the future of our global environment by taking advantage of unused disk space, computing power, and will both reduce discarded hardware into our earth's ecosystems and the erosion of its ozone layer. In addition, its widely use in the networking businesses will result in tremendous cost savings in reducing the need for expensive new hardware for all data storage as well as reducing the cost of electricity for now at-capacity systems that are housing large, multimedia, multi-purposed, and elaborate software infrastructures due to their need for high computing power levels.

BRIEF DESCRIPTION OF THE DRAWINGS

The disclosed application will be described with reference to the accompanying drawings, which show important sample embodiments of the invention and which are incorporated in the specification hereof by reference, wherein:

FIG. 1 schematically shows an example set of functional components for a distributed server system in accordance with this application.

FIG. 2 schematically shows an example set of structural components for a distributed server system in accordance with this application.

FIG. 3 schematically shows an example set of communication paths for a distributed server system in accordance with this application.

DETAILED DESCRIPTION OF SAMPLE EMBODIMENTS

Figure 4:
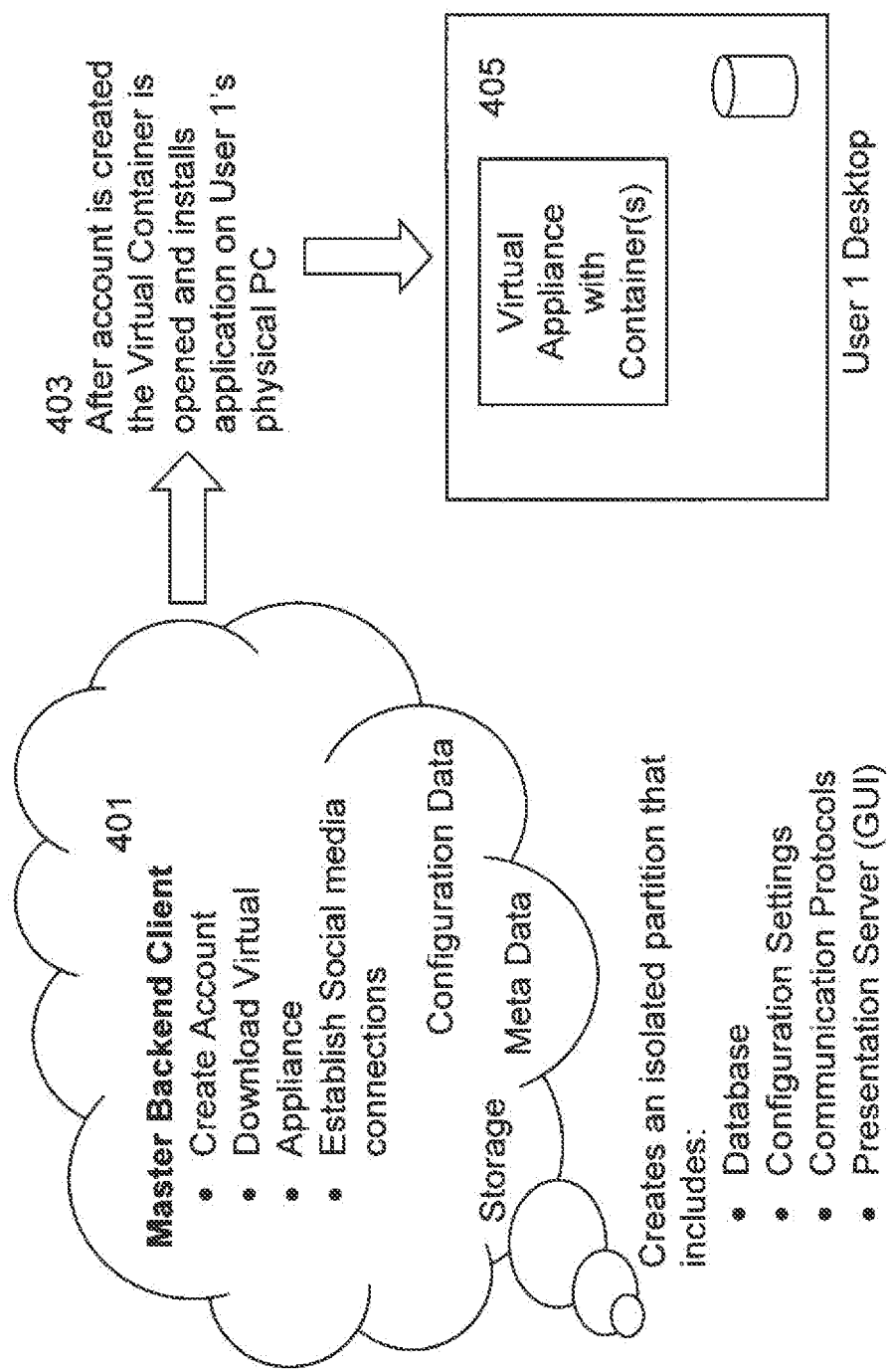
FIG. 4 schematically shows an example deployment process for a distributed server system in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

A Backend Master Client Machine, or a Master Host, or a Master Host Server are all synonymous terms. The terms are used interchangeably to describe the (1) One "Backend Master Client Machine"; comprised of (1) One Hardware "ARM" server computer that will perform multiple roles with multiple partitions as follows (1) One (IDE) Integrated Development Environment that will build the core framework, including all the software containers and binaries encapsulated within the Virtual Appliance Instances and their encapsulated containers that will build the foundation and architecture for a full blown distributed application level virtualization hub.

An ID or Unique ID or Profile Preference Identifier are all synonymous terms. All three words are used interchangeably to described a Unique Profile Identifier assigned during the Registration process. This Unique Profile Identifier is used by the Master Host Core Framework Engine that will handle, control, and perform all the necessary security audits for the proper assignment, authentication, and authorization of a role into a certain user community based upon this "Profile Preference Identifier" as well as for determining access rights for authenticating to other cross-domain communities.

(JEOS) Just Enough Operating System or (RTOS) Real Time Operating System are synonymous terms and are used interchangeably. The invention will build a hybrid version of the two intended to serve real-time application requests in response to user triggered event tasks, hardware interfacing, service priorities, and scheduling priorities. Another feature will include a one-of-a-kind orchestration with key processes for building multi-threaded applications deployed as a Virtual Appliance to ensure continued minimal interrupt latency and minimal thread switching latency.

Collective Intelligence is a core analytical process of the Distributed Hybrid Virtual Media and Data Communication System, whereby meta-data information is profiled, gathered, stored, and utilized in an open way for ongoing social learning. For this invention, a collective intelligence store will have the ability to capture any event driven user related task, including a live streaming video instance as defined by a user or a mentor. Thus, the collective intelligence store will include its own proprietary database schema and structure that can execute code from its binary container to correctly evaluate task related events. This analytical functionality enables a knowledge base capable of automatically discovering, capturing, and publishing common properties for both similar and dissimilar domains alike, and is also capable of making intelligent decisions based on those discoveries, and then storing the results as a collective intelligence knowledge based store. This store will eventually over time become a highly evolved "Knowledge Hub". The data captured within the hub is solely based on meta-data gathered from a user's profile. The meta-data will be collected, gathered, and profiled based upon its rules based engine, and of which it can act upon, revise, execute, and format a graphical user interface view upon demand for all authorized requestors. Additionally, due to the fact that the graphical user interface viewer is a descendant of the virtual desktop infrastructure; the view can be re-purposed and modeled into a highly formulated customized dashboard view.

A Server ARM is a term used to describe a low-power consumption server that utilizes (RISA) Reduced Instruction Set Computer; and (ISA) Instruction Set Architecture. The simplicity of an ARM server and their processors have recently become a dominant force in the mobile and embedded PC Server and Electronics Markets, because they have small but powerful low-cost micro processor(s) and microcontroller(s). As a result, they are also an excellent source for building and deploying Virtual Appliances containing the binaries for deploying large multithreaded applications as well as the enablement of Real Time Operating Systems for task-centric processing at the kernel level for building minimal file systems deployed as part of a Virtual Appliance binary for mounting a local physical disk in preparation of application software stack execution.

"Re-purpose" term is a conceptual and semantic term for reuse; in theory. For example, when you enable a physical machine to run virtual machines, then you enable hardware to be reused for a different purpose.

A "Component" is physical replacement part of the system that conforms to and provides an actual realization through a set of interfaces. It includes automated software virtualization interfaces that comprise all the source files, binary code, executables, scripts that are packaged for performing the intended functions.

A "Subsystem" represents a combination of a package and a class. The package contains all the elements, including unique id elements, models, source files, html files, etc. that has one class that realizes these interfaces to the one unique package. For instance, in IT design terms; a subsystem is an interface user class represented as an actor symbol that (can) "extend" or "include" the live streaming media and data communication hub package.

"Methodology" term means a structure and nature of steps in the development effort. Process and Methodology may be used as separate terms. For instance, The Rational Unified Process is an industry standard for a software development process.

"Process" term in this application means coming up with a solution, and then writing a program or code for the solution.

"Method(s)" term means a method for object oriented programming code whereas it performs a subroutine and is exclusively associated with a class or an object. Normally, consists of a sequence of programming statements to perform an action, a set of parameters to customize those actions, and possibly an output value (sometimes called a return value).

A "Framework" means a set of multiple but unique methods (methodologies) for the automation of remote data network services, data communications, data storage, and data storage retrieval. Uses include: Live Multimedia Streaming for the enablement of Global Learning Portals, Social Media Hubs, Collective Intelligence Hubs that can enable collective intelligence as stored business intelligence data, and for Energy Efficiency by enabling a method that reverses the need for large data centers by enabling machine to machine connection with like-peers in a virtual domain. In essence, there is a computation model of one dumb client to many smart servers, a method reverses client-server computations.

Software Virtualization means differently in this application with Application Level Virtualization. Their methods and actions are very different. Application Level Virtualization deals with 'how' the application platform is deployed and where it actually sits in regards to an operating system. Software and appliance containers deal more with packaging and bundling of the software components into one acceptable package for deployment.

Desktop Virtualization Infrastructure also means differently in this application with Application or Client level virtualization. Although they both involve converting a physical client in an operating system environment into a virtual machine, and accessing that machine over a network, the desktop virtualization uses a virtual machine disk while the application/client level virtualization uses just a virtual machine.

A "Virtual Appliance Server" is a single physical machine instance and is one that transforms a physical client machine into a virtual server by isolating and executing a virtual appliance container that will bundle and wrap a single binary instance of a software image based upon one's profile abstraction and domain it is assigned to. All software instances execute via its application layer to internal domain clients or externally to a third party service via a unique API. The Virtual Appliance Servers can also host and house all storage data locally on a physical machine, but can offload due to CPU overload to other internal networks by installing a software appliance bundled components to a virtual machine and then packaging that creates a virtual appliance of type that can execute locally from a physical server machine disk.

A "Virtual Machine" is in essence a physical server machine that eventually is converted to a unique virtual appliance server machine via a virtual appliance. The virtual machine will create, store, and transfer multimedia data to other social network places (profile domain pools) and/or other server entities. The virtual machine will also be utilized as a tool that will have the ability to control and/or connect to other software images by stripping off and reassigning new and unique user and system identifiers.

A "Virtual Appliance" is a virtual machine with bundled images that have been preconfigured and designed to run on a particular virtualized network platform domain based upon who you are and your role. A Virtual Appliance is subset of the broader class of a Software Appliance. A Virtual Appliance aims to eliminate the installation, configuration, maintenance costs associated with running complex stacks of software over specific virtualization platforms.

Additionally, another type of virtual appliance bundled is one that is designed solely for data execution in a database, and is comprised of all the necessary staging, access, integration for reporting and analysis from a virtual server machine instance that is stored locally on the isolated partition. When triggered by a user, the appliance image will execute the means to retrieve and analyze multimedia data (video through learning) archives. Thus, this allows for the necessary components to be extracted, transformed, and then loaded to manage its own data dictionary of type.

"Application Layer Services" are reusable utility (use only what you need) services that are made up of many business services, including web services.

"Web-Service" is an application layer service that executes via a public Internet interface via TCP/IP port 80 or TCP/IP port 8080 and doesn't necessarily imply to a web site; although it can. A web service is one that can be located, discovered, and published via a network channel. Additionally, a web service can also act as an intermediary business application service agent that is an encapsulated service provider, but can also be a service requestor. This business service requestor can be a standalone piece of functionality and does not use a WSDL as an endpoint. Instead it has the capabilities and logic to intercept messages without a WSDL end point. Normally, this type of service-agent acts as light-weight program executable that has a small memory footprint and can be custom developed. This component may not encapsulate a true web service as it does not have a WSDL endpoint, but will expose an internal, yet unique set of API libraries that will allow a single binary executable to "wrap" services so that tens of millions of requests can be granted at a time. By doing so, an optimal processing efficiency is achieved so that an offload does not have to be performed, for example, to an internal network. With optimal load balancing being achieved a CPU is not taxed to the max as to crash a physical server disk or its domain network community. A "Web Service" generally means Services that are application oriented and encapsulate a business logic that executes an application as a business service, for example, a Live Streaming Service for Video.

For "Network Services", there are two types. One type of "Network Services" mean file sharing services, file services, collaboration services, and messaging. They can also be located, discovered, and published. Another type of Network Service, taking the form of a Network Interface, implements a standard connection protocol, such as Ethernet, Wireless, etc.

"Service" means either a Network Service and/or Web Service.

"Hybrid Virtualization", specific to this invention, does not utilize a hypervisor nor is its goal to run multiple guest operating systems that can access a web server. Hybrid Virtualization in the context of this patent means that it utilizes an adaptive application level virtualization layer with unique techniques to abstract computer resources in a way that separates the application services from the underlying physical hard drive resources, has its own virtual appliance containers and binaries, has its own real time operating system that runs a kernel, and has its own minimal operating system for the enablement of mounting mount different file systems, profile management and registration execution, and many other tools to enable a distributed domain network. This invention then is capable of social multimedia networking that executes at the application layer via its Virtual Appliance Service Instances and has the capability of connecting to other domain communities and third party entities for live multimedia streaming and multimedia social networking via its Virtual Appliance images. The invention is not really a true peer-to-peer mesh network although it has some similarities. However, it is more like a dumb terminal with a hard drive with the exception that the invention utilizes Virtual Appliances as mirrored instances for local execution. Nor does this invention implement the traditional client/server logic relationship, but reverses the client/server roles from many-clients-to-one-server to many-servers-to-one-client logic relationship by enabling client computers to become virtual server instances through virtualization. Thus, this invention enables its own unique set of algorithms that transforms old service oriented architectures and virtualization of all types into a new purpose for global social collaboration and learning, provides for the enablement of a greener computing environment, and decreases the power needed for our increasing computing usage. Thus all the unique features and tools of this invention enables an adaptive hybrid virtualization application that transforms a local personal computing device and unused device space into a global distributed hybrid Virtual Media and Data Communications System. The purpose of this system is for live streaming, multimedia sharing through distributed domain communities with like interests so that the communication and collaboration instances can be captured and reused for global learning and a greener environment for tomorrow.

A "Backend Master Client Machine" means a set of functionalities that has the ability to register a user to bind to a certain network domain as well as build the virtual appliances for each user abstraction of type, for example, Coach, Student, Player, Fan, Admin, Other. Additionally, the backend master client machine enables a development environment for the application packaging of the domain software abstractions and instances that not only ensure the integrity of the server machines, but generate the root file systems for the binary software images. In such, they properly execute the correct software image to a certain network domain pool that identifies the pool of virtual application server machines. This IDE environment runs the necessary routines and subroutines for not only building one instance of an application that could be packaged and executed, but also provides Just Enough Operating System (JEOS) for building the above said architecture. The role of this machine is not just to perform the necessary computations for a backend file server to execute a certain file in response to a request, as that will be handled at the local disk level, but to build a set of workable images as a composite application.

A "Model View Controller" is an architectural pattern for the application data that are separate from the view and controller of host machines. The presentation layer implements its own views, as mirrored instances that deliver an interface that will implement the logic for processing user data and input on a locally virtual application server instance. For example, the Distributed Hybrid Virtual Media and Data Communication System implements its own framework with its own set of libraries, interfaces, and useful tools that can be used to build and implement dynamic applications for multimedia streaming and collective intelligence hubs. Also, the Distributed Hybrid Virtual Media and Data Communication System Distributed Hybrid Virtual Media and Data Communication System transforms the physical components into a virtualized components made up of web services, networks, and business application services for performing TCP/IP related tasks as well as the utilization of many of other protocols that are server related tasks, such as interactions with its own embedded databases and other internal databases via its domain network pool. It also wraps services, such as multimedia services as a generated instance of a single executable binary.

A "Round Trip Virtualization Platform" provides for a direct transport and route for traditional on-premise applications to be rapidly deployed locally on a user's physical machine as a "Service Instance Model". The implementation of this platform eliminates the need for huge maintenance costs now attributed for re-architecting of application services that reside in mega data centers.

The implementation framework for social communication employs a model for "Learning Through Observation" and provides a solution for the need in large mega data center hardware that is growing exponentially. By decoupling the hardware from the operating system and from its application platforms, and through the reversal of the roles in the conventional system, to achieve efficacy and the unexpected results.

Additionally, it is contemplated and intended that the architecture not only functions in reverse of client serving computing, but also encapsulates and build application services through a service oriented architecture layer consisting of an application layer, a business service layer, and the orchestration layer. Then, the service models encompass utility services and wrapper services for a total systematic application to virtual transformation.

Thus, the backend master client machine generates and packages as part of virtual appliance, a root file system for the binary software images so they may mount and execute, as well as consist of a unique set of API's for the multimedia streaming and data communication hub.

In reference to FIG. 1, a distributed hybrid and adaptive server system 100 may include pluralities of functional components, for example, user interface 101, backend master client machine 103, reusable master search engine 105, registration system for unique profile IDs 107, database store build for each user virtual server 109, virtual appliance packager 111, master application and smart controller builds 113, all configurations and utilities for virtual server transformations 115, automated interface, graphic user interfaces and composite application builds 117, profile server and mapping 119.

The example structural components involved are shown in FIG. 2. Electronic distributed system 200 includes Data Storage Virtual Machine Repositories 201, Collective Intelligence Rules Based Engines 209, Notification Handler 217, Access manager 225, Virtual Desktop 203, Automated File Master Handler 211, Integrated Messaging and Communication Engine 219, Client Machines to Virtual Server Machine Transformation 227, Boot Loader Kernel 205, Application Engines 213, Metadata Generator (XML and other) 221, Master Database Profile Store on Virtual Disks 229, Business Web Services Interfaces 207, Streaming Architectures 215, Presentation Server and Generator 223 and Master Controller 231. FIG. 3 shows the communication paths between these components are through Secure Direct Path 301, Web Services Broker Engines 303, and Device Engines 305, such as drivers or other hard ware devices.

The software platform may be provided by the developer company, and media service providers and social networking service providers may be its business clients. Media Service providers or networking service providers may also provide their own Virtual Software Appliance from their own web domain themselves. The Virtual Software Appliance package includes the configuration information of connecting to the service providers' backend service server machine to become part of the server network with a specific service provider's service server(s).

In reference to FIG. 4, during deployment, when a user is registered, agrees to the agreement to the system vendor's web site and specifies a specific media service provider or a social networking service provider, the vendor's system automatically connects to the specified service provider's Master Backend Client Machine located on the service provider's server machine. The specified Master Backend Client Machine 401 connected with the vendor's server machine creates an account for this user, and downloads a Virtual Appliance package to the user local machine that establishes social media connections the user is interested in and the configuration data, storage meta data. At step 403, the downloaded Virtual Container is opened and installs the application on the user's physical local computer. At Step 405, the installed Virtual Application Appliance creates an isolated partition on the local computer that includes a database, configuration settings for the local machine and the remote Master Backend Mater machine, and the communication protocols and a graphical user interface.

The installed Application Appliance builds a peer-to-peer hybrid instance. It in a sense turns the user's local hard drive into a dumb terminal system, therefore different from the conventional client/server structure. Instead, the system implements a virtualization platform that reverses the client/server computing role model from the many-clients-to-one-server to a many-servers-to-one-client role model by enabling a user's computers to become server virtual instances through virtualization.

Figure 5:
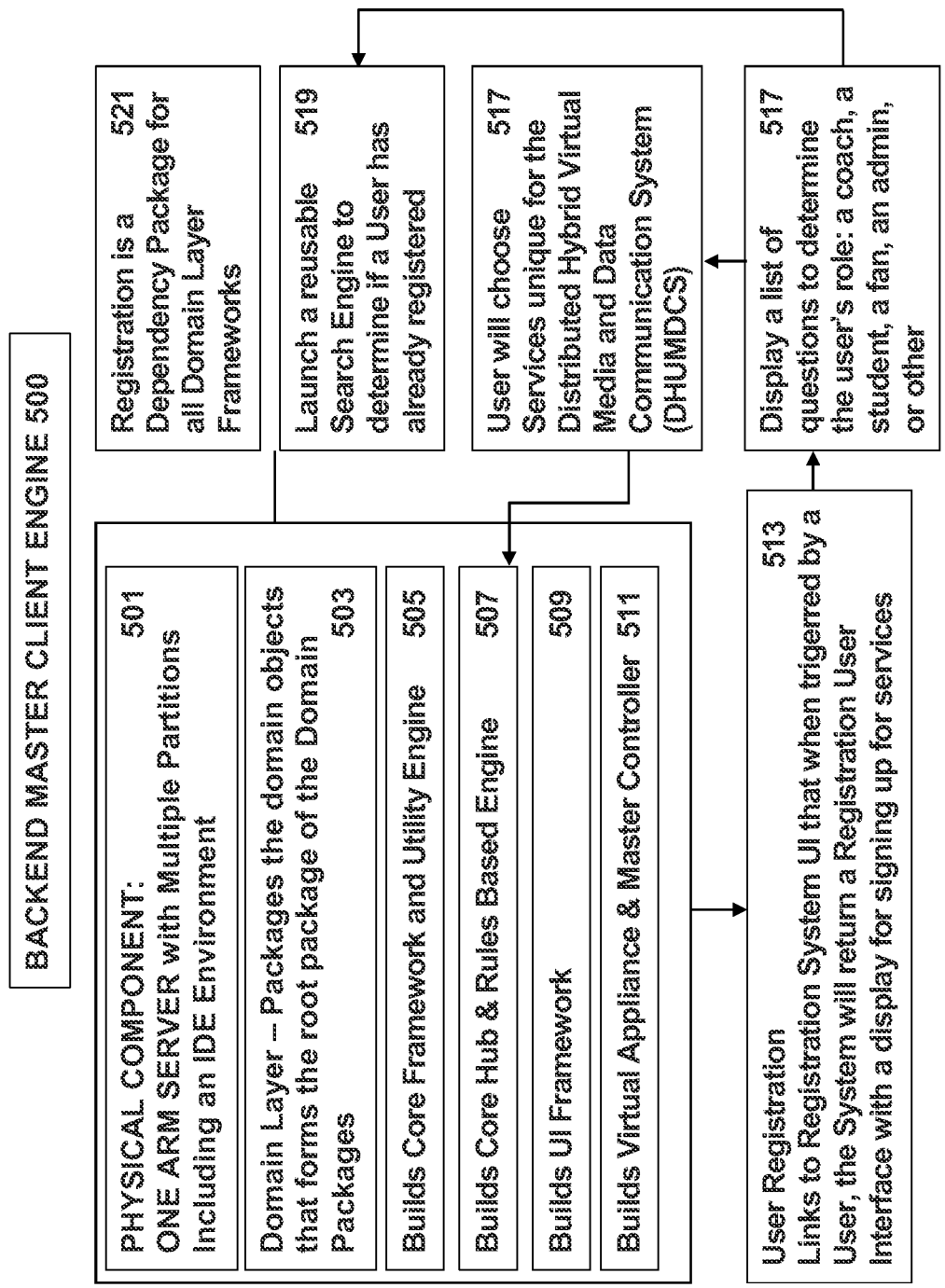
FIG. 5 schematically shows an example embodiment of a backend master client engine for a distributed server system in accordance with this application.

In reference to FIG. 5, a Backend Master Client Engine 500 is physically located on a server of a service provider, a one-arm server 501 with multiple partitions including an IDE environment. The functional components includes a domain layer 503 that packages the domain objects that forms the root packages of the domain packages; component 505 that builds Framework and Utility Engine; component 507 that builds core hub and rules based engine; component 509 that builds UI framework; and component 511 that builds virtual appliance and master controller; and Registration unit 521 which is a dependency package for all domain layer frameworks.

User Registration

At step 513, User Registration unit is linked with a Registration System UI which can be triggered by a user. When Registration Unit 521 is triggered by a user, Registration Unit 521 returns a Registration User Interface with a display for signing up for services. The display lists a plurality of questions to determine the user's role, such as a coach, a student, a fan an admin or other at Step 515, the registration unit sends the choices and answers of the user back to the backend master client engine at step 517, and also launches a reusable search engine to determine if the user has already registered at step 519, and creates a profile for the user on the registration unit and the user database on the backend master server 500.

For each network, profile users act in an internal domain community through an interconnected set of internal and external networks based upon his/her role(s). For each server pool, and through the use of Link Aggregation/Location Services, the user is assigned multiple physical network interfaces for its own VLAN or Virtual Local Area Network implementation that allows the location to define its own independent Local Area Network Services for all associated and for all those that are on a single protocol network interface. Thus, users that have multiple network interfaces can also simultaneously invoke a connection to a Virtual Private Network (VPN) or to a USB via a Cellular Network Address (for example, hot-wire). Thus a user can use Link Aggregation (a IEEE 802.3ad Standard) for its virtual network interfaces, use the standard IEEE802.0 standard for a VLAN, and a VPN uses the standard interface via layer 2 tunneling protocol (L2TP) over IPSEC or Internet Protocol Security.

A user can bind to a community of virtual domain networks, whereby a user triggers a live streaming event, either as a 1× service or as a subscription based service. Additionally, the system has functionality to search for a user via a profile (directory) service and an encryption service may be part of that implementation detail. The other implementation detail for searching and finding a user may be through a separate binary tree search. Once found, the binary web service allows a user to connect to and mount other file systems within a network if they are authorized to do via his/her role OR as an option, go to the part about a preference file being assigned and bound to a user at registration time. A user may automatically be granted connection based on a proprietary type of dynamic directory services that automates authorization and authentication for the log-in process to other network pools and their encompassing file systems.

This physical to virtual registration system code the system produces is re-purposed or reused; thus creating a cost-effective and efficient processing method for deploying complex software code development. Once the code is produced and re-purposed it can be redeployed for the quick development and deployment of other physical to virtual components such as the user manipulation software components for the virtual streaming "playground", or the virtual multi-media content handler. The data that is gathered or collected from the initial profile forms will be utilized to build or grow collective intelligence data stores which can be repurposed and utilized by other third parties.

Those that are already servers on single user machines will become server virtual instances to execute applications in isolation and away from the operating system. Additionally, to make the world greener and technology much simpler. The many servers will also act as unique storage hosts for the large multi-media components and/or any type of software virtualization appliance bundles that are determined to be beneficial to deploy across the Distributed Hybrid Virtual Media and Data Communication System infrastructure.

A storage component is implemented on the back-end DHVMDCS Server to house user profiles with unique IDs, new software interface bundles, and software updates. It may also store .xml files for versioning controls on each individual local user disc machine once converted to a virtualization server instance.

System Master Controller

The Application or Client Level Virtualization infrastructure and its corresponding sub architecture can either be subscription based or act as a deployable architecture with a major hardware vendor. It may be subscription based and leased to a major customer, such as "The Panthers" and the software interface or gadgets may be downloaded on the fly. It can also have a third party hosting component for certain features, such as the live video streaming. The application can also be deployed to any architecture, any operating system and within any business domain, and within any country.

Application or Client Level Virtualization is broadly described as technical abstraction of hardware resources so that multiple software products can uniquely share in the use of the hardware through two types of emulation without being in conflict with one another. There are four major types that fall under this category of virtualization. They have one commonality in that they all involve methods and techniques for secure isolation of an application that runs on a physical client machine that separates the application from the operating system state and its resources.

The four types are application packaging virtualization, application streaming virtualization, virtual desktop infrastructure virtualization, and hardware emulation (sometimes referred to as application level hardware emulation).

Distributed Hybrid Virtual Media and Data Communication System system of this invention uniquely provides a virtual transformation software system with the combination of application packaging virtualization, application streaming virtualization, virtual desktop infrastructure virtualization. The invention implements a Hybrid Server type to replace the fourth type of Hardware Emulation.

Software Virtualization means differently in this invention as to Application Level Virtualization. Their methods and actions are very different. Application Level Virtualization deals with 'how' the application platform is deployed and where it actually sits in regards to an operating system. Software and appliance containers deal more with packaging and bundling of the software components into one acceptable package for deployment.

Desktop Virtualization Infrastructure also means differently in this application with the application or client level virtualization. Although they both involve converting a physical client in an operating system environment into a virtual machine, and accessing that machine over a network, the desktop virtualization uses a virtual machine disk while the application/client level virtualization uses just a virtual machine.

Virtual Desktop Infrastructure (VDI) is broadly described as the end user desktop in a virtualization environment. It resides on a desktop and is accessible by the user. Also, the Desktop can be assessed over a network and can also utilize machine/server level virtualization on the backend as the virtualization engine that runs the virtual machine disks.

Application Packaging Virtualization (APV) system actually executes an application on top of a proprietary software product. An application and the Software Virtualization system may be bundled into a single executable program that can download and install when the executable is run. The application and the Software Virtualization (of type) can cooperate together and then the Application Packaging Virtualization runs in an isolated sandbox "test" environment; or in a separate partition from the underlying operating system.

This invention implements an Application Streaming Virtualization (ASV) system that invokes two subtypes. The main subtype (Subtype A) is software updates to the virtual desktop and/or other application code bits in other virtual machines within an Application Level Virtualization infrastructure. The second subtype (Subtype B) is for presentation or content; such as the live meetings or video streaming.

Both of these subtypes can maintain and control software versioning by storing proper versions of application the back end server as .xml file. Thus, there is a huge advantage of deploying this type of virtualization, because it has an added version control engine that will have the ability to effectively execute .xml calls to either a file handler or as the executor of those calls to the master host server (DHVMDCS Server).

Subtype A or the first subtype mentioned above can run in a constant progressive stream even if it is offline or without network connectivity. It provides an added layer of security controls as it cannot be re-engineered nor be deleted by an end user. Plus, the remote registry cannot be altered nor changed. Since it doesn't actually hard disk space to function then the external storage isn't a problem since the other virtualization types will take up its slack if need be.

Subtype B needs to have the connection closed once the progressive stream stops. However, if the stream is constant then it could operate with a steady progressive stream as Subtype A. Optionally if an end-user wants to download multimedia or other software on the fly from this software bundle, he/she could as long as it is from this software bundle and not from a third party. Plus the user can utilize the software without a major hassle, because it appears as though it is natively installed on the machine while it is not, it is contained within the virtual machine disks or the virtual machines.

For Hardware Emulation at the Application or Client Virtualization Level a Hybrid Version of this type of Virtualization is implemented. This includes a JEOS (Just Enough Operating System) or a RTOS Real Time Operating System to deploy the application instances without the need for a third part operating system kernel such as Microsoft or Mac. It also embeds non-specific programming languages that offer binding to a system or machine instance similar to a PVM (parallel virtual machine) or a MPI (messaging parsing interface). However, the Hybrid System's own instances are contained in a container.

In this type of Application or Client Level Virtualization software presents a representation of the Hardware that it interacts with. This type of virtualization is the same as the Hardware that is based on Intel's x86 chip architecture, powers everything from basic desktops, to Mac's, to servers in mega data centers. So, this virtualization type is for both of the following types of virtualization: Application/Machine Level Virtualization and Server/Machine Level Virtualization type.

The virtualization software bundle is loaded automatically onto a client machine once it has registered a multimedia live streaming service. Hardware Emulations can be loaded onto a Windows, a Mac, and a Linux. Once the hardware is loaded, then it is ready to support a host for a virtual machine that can execute its software to its peers and third parties. A peer is a domain network made up of the profile abstractions, for example, a Coach, a Student, a Fan, or others. Under each of those domains there may be sub domains for instance of each, for example, high school coach, high school student, high school fan (a high school fan is a fan of a high school student which could be a friend of family), a high school admin (a high school admin has the ability to either be a coach or an admin or both).

Server/Client Machine Virtualization as a type of virtualization that is totally different from the Application/Client Level Virtualization in that these are the technologies work on top of the operating system or below the operating system. Additionally, they all support a host operating system.

There are three types under this umbrella of Server/Client Machine Virtualization and they are: operating system virtualization, hardware emulation, and para-virtualization. These are discussed here solely for noting the differences between the virtualization types and our invention that creates its own unique hybrid virtualization type.

a. Operating System Virtualization

This Virtualization type runs on top of an existing host operating system and provides a key set of libraries that the applications can interact with, thus giving an illusion that it is running on a machine dedicated to its instance. Much like the Application/Client Level Virtualization, but they execute inside a "Container". Each set of applications is in a Container within its assigned operating system and cannot interact with other operating systems or the applications running in those virtual operating systems. Additionally, each container has its own file system that looks like a complete large global distributed web hosts utilize this technology to deploy operating system, but in reality the file system actually maps to the underlying host operating system in such a way that it isolates each Web Site's file system from the other. Many people like this "shared" hosting option rather than the dedicated servers that you can lease with a hosting company.

This invention creates a hybrid system that decouples a single instance of an operating system for deploying some of these features from the backend Master Host via Virtual Appliances and does not host a website. This is also extremely useful for converting one's own personal computing environment into a different view for the a Live TV and Radio Station component.

Through the enablement of a (MVC) model-view-controller framework, multiple views can be attached to a model to provide different presentations or to create new views without having to rewrite new code. In the context of this inventions presentation framework, the (MVC) Model, View, Control Pattern is used in such a way that the Model is the Data Representation, the View is the (GUI) Graphical User Interface Screen Presentation, and the Control is the Messaging Collaborations between the system and a user, or in the context of the presentation; how a Graphical User Interface reacts to user interactions. As an example, if a user decides to transition to a different view, then an interaction triggered by the user would trigger the behaviors necessary for decoupling the view and model by establishing a subscribe, notify, protocol between them. It should be noted that a "View" must always ensure the appearance of the "State" of the "Model". Thus, whenever the Model data changes, the Model must notify the View(s) that depend upon it. In response to the notification, the view is updated dynamically and on-the-fly. Please also note that the "Update" is a "CRUD" Create, Update, and Delete precondition to the Model. As code imports several abstract "classes" and "distinct" methods that are triggered at various points during the applications lifecycle, an "On-Creation Complete" is called when a user interface has been created upon the initial application is booted. The goal of this function is to get an instance of a composite application model that will track its application state. Thus, the model will always be the notifer of a request to change its application presentation viewer state.

b. Hardware Emulation

The invention utilizes its own real time operating system or just enough operating system to implement its own hardware emulation as the invention does not utilize a hypervisor nor does it host guest operating.

c. Para-Virtualization:

Although para-virtualization is outside the scope of this invention, it is worthy to note here for visualizing different virtualization instances and methods. This type of virtualization does not create an entire virtual machine to host the guest operating systems, but enables the operating system to interact directly with a "Hypervisor". Also, this type of virtualization creates an entire hardware emulation layer between the guest operating systems and the physical hardware. The hardware acts like a traffic cop allowing one Guest OS access to its physical resources while stopping all others Guest OS from assessing the same resources at the same time. It is noted herein that hosting guest operating systems is outside the scope of this patent invention.

For Storage Virtualization For Physical Machines and User Data, there are three types: a.) Direct Attached Storage (DAS). This type of consists of hard disk drives attached to a physical server running the application. b.) Network Attached Storage (NAS). This type sits on a network and offers storage to other machines. c.) Storage Attached Network (SAN). This type is key for 24/7 resource availability, since it utilizes very specialized hardware and software to transform mere hard disk drives into data storage solution that transfers data on its own high performance network. SANs provide the ability to add additional storage capacity as the data storage requirements grow. SANs also have the capability to be configured to use in a multiple redundant pieces of storage hardware so that the data is always available, even if one or more piece of storage hardware fail. A SAN architecture, and its corresponding servers do not bother transferring data across the standard NIC to Ethernet cable to a corporate route on the network. Instead, they utilize their own SAN interface device called a Host Bus Adapter (HBA) to connect to their SAN by utilizing a specialized network protocol. One of those protocols is called Fibre Channel. The second option is to use ISCI for network communications.

These storage virtualization's offer an option to store an image on an individual server machine and a hard drive on a local machine can be subdivided into sections or a partition. Although each partition is a separate piece of storage, the totality is owned and organized by the physical machines. In a shared data storage arrangement, such as NAS or SAN, where a number of machines might have storage on a single device, a solution is provided to section off the data so that the machines can have dedicated partitions of a device's storage and can be prevented from accessing that storage to another machine. a Separate schemas/specifications are constructed for uniquely identifying and parsing these storage spaces.

Our invention enables Application Level Virtualization that provides many benefits. a.) Provides a resolution in solving complex resource management issues in the administration and management of software applications in a large distributed global networking environment. This is because; application/client virtualization offers a more controlled management of the end user need and usages.

This benefit results in a significant cost savings in the backend administration, licensing, and maintenance costs as well as a significant cost savings benefit to the end users for the initial software implementation and on-going maintenance. Cost savings could be upward by as much as 70% from a traditional "SAP" or "Oracle" software hub.

b.) Another benefit results from client machines having endless amounts of "junk" data on them. Due to the very nature of being human, people across the globe download "stuff" on a daily basis. This "junk" and "stuff" can create havoc including potentially serious critical issue to a machine's operating system as well as to an operating system hardware and critical applications. The truth of the matter is that Microsoft is the dominant and preferred operating system of choice across the globe. Because of this, Microsoft's systems are notorious for attracting attacks in the form of spyware, malware, viruses, Trojans, as well as spam targets. With that said, Application/Client Level Virtualization shelters the end software product by uniquely isolating its software components into virtual machines, containers, and disks.

c.) Another option is that customers will no longer be paying for a product but purchasing a specific set of (pick and choose) of web services that will execute across a virtualization infrastructure. Additionally, customers won't need to change their major legacy systems to accommodate the application. This is a huge tangible benefit as most companies do not want to pay for something they cannot utilize and then have to customize it.

d.) The market for a product like this one allows for selling higher volumes, cross sales (such as web hosting for one aspect of the live streaming), and multiple domain business sales. In essence, this will become a virtual engine that can adhere to any business domain model. It is simple economics, if you have an application that reduces costs as compared to a competitors by 80%, then you can sell five times more of what a customer needs for his business, and you will come way out ahead and with a happy customer.

Figure 6:
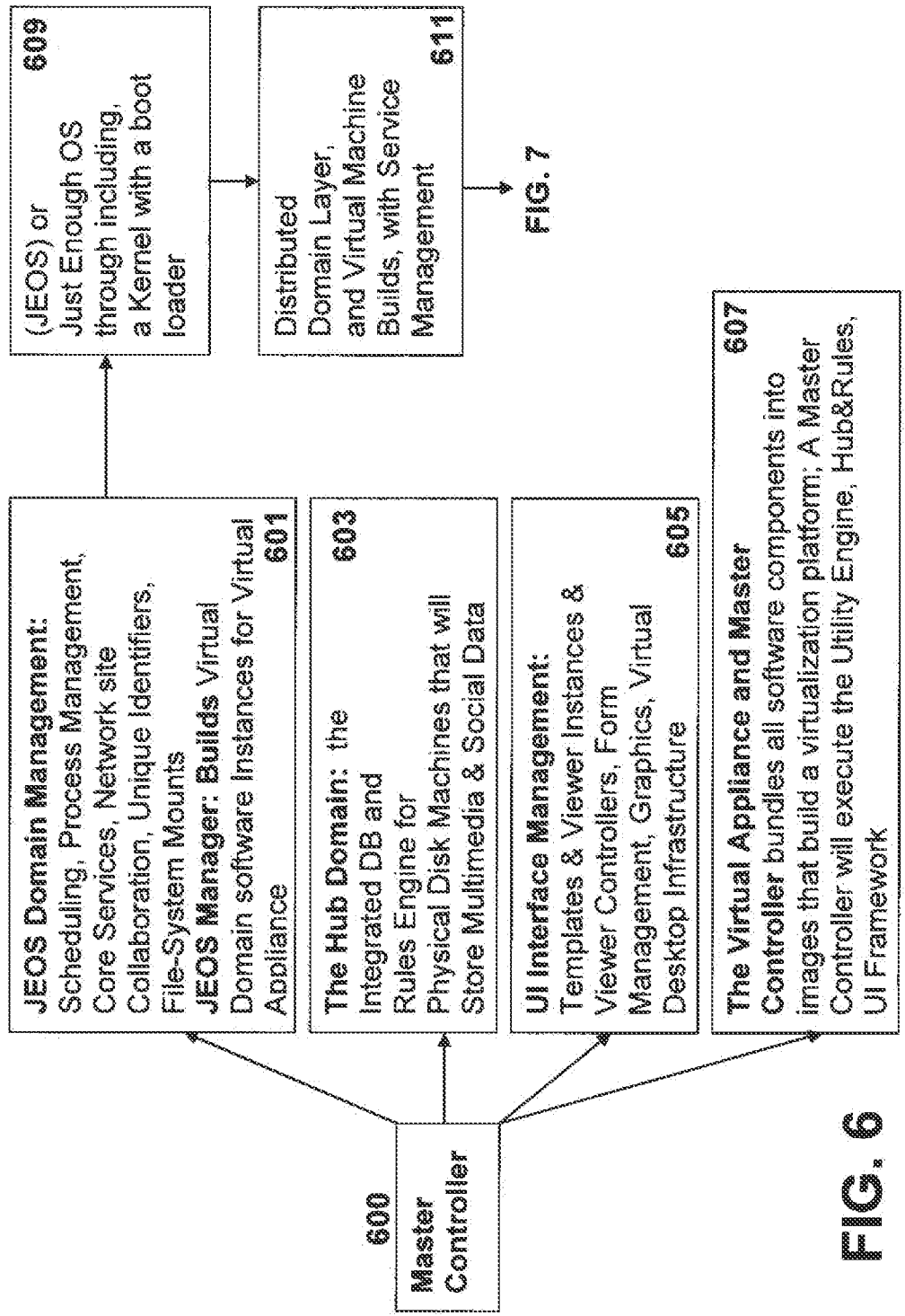
FIG. 6 schematically shows an example embodiment of a master controller for a distributed server system in accordance with this application.

In reference to FIG. 6, a virtual appliance of the invention contains a system Master Controller 600 which includes JEOS (Just Enough Operating System) Domain Management and JEOS Managers 601, Hub Domain 603, UI Interface Management 605 and Virtual Appliance and Master Controller 607.

JEOS Management Domain 601 includes JEOS 609 that contains a Kernel and a boot loader for interacting with an operating system, and a Distributed Domain Layer 611 with virtual machine builds and service management. JEOS Management Domain 601 provides scheduling and process management, core services, network site collaboration, unique identifiers, file-system mounts, and also builds virtual domain software instances for the virtual appliance.

Hub Domain 603 includes integrated database and rule engines for physical disk machines that store multimedia and social data. UI Interface Management 605 contains templates and view instances and viewer controllers, form management, graphics, virtual presentation or virtual GUI Viewer.

Virtual Appliance and Master Controller 607 bundles all software components into images that build a virtualization platform, and the master controller executes the utility engine, hub and rules 603 and UI framework 605.

Adaptive Virtualization

The invention therefore implements a method of operations that enables a round-trip application software and networking virtualization platform; entitled "Distributed Hybrid Virtual Media and Data Communication System" for the delivery of application and network operations. An adaptive virtualization computing layer is implemented for the realization of deploying applications from a software stack that includes virtual appliances with encapsulated containers for deploying social multimedia data and live streaming media computing hubs on the fly.

One Backend Master Client ARM Server computer will provide the IDE environment and the one-time runtime environment. This task includes the one-time build of a unique JEOS or RTOS Kernel for packaging an instance of a bootloader, initialization, routines, and subroutines for task management activities. Once the IDE environment is built, then the Application Images will built from the Composite Applications. Additionally, the User or Profile Framework will be created that includes the Registration User Interface made available via one website instance. This is a dependency package and a Virtual Appliance Bundle cannot be deployed until a user has registered and a unique Profile Identifier for the user has been captured and stored in the one backend master client. Please note that this is outside or external to the scope of the Virtual Appliance Bundled Containers (Packages). Then, all the other executables and components as set forth herein will be designed to uniquely build, bundle, and deliver packaged instances of a Virtual Appliance. These instance will encapsulate all necessary component images to execute and uniquely build a virtualization platform so that multiple physical server disks are implemented on-the-fly. The packaged container code with application software instances provide the necessary tools to build one composite application for each abstract role that can be deployed and that will execute one application instance of its existence to multiple virtual disk server machines, based on a profile and the services and roles authorized for a profile.

The packaged instances of the Virtual Appliance also contain the necessary tools to strip off and reassign new and unique services via a unique set of API libraries. This is much different to a file server which cannot perform computational tasks nor execute programs, all computations and storage of data will sit on each physical disk server and each individual physical disk server will perform all its own computations necessary for communication, messaging, and viewing multimedia data from each local disk physical server instance.

The containers are packaged instances encapsulated within a Virtual Appliance that provides all requisites necessary to mount a physical computing device hard drive with a minimal file system external or local, into an isolated partition that upon execution of the said Virtual Appliance will unwrap the necessary images and binaries within the Virtual Appliance bundles to the drive. Upon doing so, the disk will automatically be mounted and a local physical hard disk partition will be created into a unique virtualization platform as the connection happens via instances of an application allowing Many storage mechanisms can be attached to a single instance.

These storage mechanisms can be accessed over a network via a set of unique API libraries. Additionally, a unique off-loader is created and can off load data instances to other interconnected networks should an individual disk resources become low.

An isolated physical disk partition will provide the necessary computations for the bundled network wrapper services to automatically execute and perform the necessary computations that will further build out the distributed virtualization network. Through the same protocols for connecting to a website, but instead of establishing a website connection, the user will connect at the machine level. These connections will build the distributed computing environments for interconnected pools of virtual server machines; and whereby he/she will then have the ability to view the individual's user disk multimedia data.

As a unique application virtualization layer will be built to provide a composite application viewer, leaving the user's multimedia and other data unique to a user profile to remain on his/her local isolated partition, whereas the virtualization channel and layer will be external to his/her local operating system. Thus the physical machine server disks provide the location for shared disk access and storage retrieval. The physical server disk machines can be attached to other virtual disk server machines to form a much larger basis for machine filing as an interconnected pool of virtual computer networks via a Virtual Appliance that executes a single binary that forms the basis for the network connections. A physical user disk can be mounted and its underlying operating system resources would not be violated. The transport mechanism and shared file data access is done in tandem when a physical server disk is connected to an internal network based on the role of the user.

The isolated physical disk partition allows the Virtual Appliance images to communicate with distributed web services by wrapping a single executable binary, allowing for multiple transports of multimedia data via said network services.

The role based set of abstract user profile registration of services will uniquely bind an abstract user profile to a network service. The system assign a profile preference identifier that will bind that profile to a network service that will act as a transport mechanism, and will discover, locate, authenticate, authorize, and connect to all the necessary software images to execute the virtualization platform, including the application environment.

The data communication hub will gather collective intelligence that will provide a basis for the business intelligence layer to execute statistics, other data, and multimedia data as needed or requested by a profile user. A profile user's disk data will be made viewable through a said composite viewer instance. To allow an authorized internal or external profile user to access the said data that will be transported via a network service and in the instance of the first scenario, the hub will act as a business intermediary for distributing multimedia data as a background service or via a single wrapped binary acting as a web service.

The data communication hub provides a second layer within the total virtualization platform that allows the software appliance image to encapsulate all the necessary tools and components for collecting, storing, and extraction over a virtualization platform. A physical disk server user will also have the ability to extract multimedia from compressed files and manipulate those images for trans-forming his/her own data that can be published via a web service to a multitude of authorized users. Thus, allowing a user to transform his/her own disk data to his/her own advantage. The composite application and viewer is only an instance of an application and has the ability to instantly connect one's own disk data to that composite application instance. Thus, enhancing an individual's CPU performance.

The system infrastructure enables live streaming with learning through observation and data communication with on-going social intelligence gathering and learning. Different to a web host machine whose primary purpose is to host an operating system, this invention enables a real-time operating system on a back-end client computer that will have its own unique kernel to enable its own low-level proprietary operating system that has a sole mission for the development and deployment of large multitasking, multi-threaded, multimedia applications. Thus, it will enable a high power chip for low power consumption as well as act as the unique handler for the view, model, and controller services.

In essence, the real time operating system is enabled prior to the other claims being executed. These are the specific functions unique for the backend master client. Additionally, the backend master client will expose a single web page instance via an integrated web-server solely for the purpose of registering a user for subscription services. Thus, this single instance is the only one that involves communication through a browser.

A unit of business logic is encapsulated as part of a service provider, but also can act as internal service requestor. A service agent, as a standalone piece of business application logic that does not have a WSDL endpoint, designed to intercept messages automatically. Thus this unit of business logic is encapsulated as a point of a service provider, but also act as its own service requestor without this endpoint mapper. The protocol can be unique, but the communication pathway is through its own proxy services. Additionally, the business application logic can interact with a separate native component to complete the processing requested by the service requestor. Thus, this invention does not encapsulate nor expose business application services as a web service as it doesn't have a WSDL as its endpoint mapper, and will expose an internal, yet unique set of API libraries that allow a single binary executable to "wrap" services so that tens of millions of requests can be granted at a time, to achieve optimal processing efficiency.

A set of multi-media template applications are exposed through "wrapper" services that "encapsulate" or "wrap" application services uniquely built for the live streaming media and data communication hub. These application services are coupled with business application services, as an out-of-the box application templates that will establish a service interface that exposes a unique library necessary to execute a single binary wrapper to enable services and whose sole purpose is to request business logic in its purest form.

These services can also implement other service model types. For example, the live streaming can enable a user interface "Viewer" exposed as a service. Other examples include: A Load Balance Service, An Internal Community Policy Service, System Notifications, all exposed as a utility services that provide a generic set of re-useable features and each is capable of acting as a composite member, fulfilling a specific task within a much larger unit of automation. Thus, application services are ideally re-useable utility services, but also can exist or coexist as a hybrid services that contain both business and application logic. Further, when the application logic is abstracted into separate application services, the backend master client or (RTOS) Real Time Operating System, will then act as a service agent for directing, controlling, and handling "Other" available services to further expose their business logic. Thus the abstraction can lead to two other business service models being implemented: a.) task centric business service and b) entity centric business services. And a business service is a type of service that contains both business and application logic.

A Collective Intelligence Store

Below is one example that might help one to better visualize the functionality.

A high-school player enters his/her player profile information. This profile is always attached uniquely to that player and continues to build his social and athletic profile which includes his stats. This player's collective intelligence store then grows over the years resulting in college recruitment. The college coaches then utilize this one player's collective intelligence store to help him become a better and stronger player.

Thus, by having this information readily available, the player has become better and then recruited by a professional sports agent. Then, the professional sports agent repackages the players profile and passes three years of collective intelligence profiling in the data store on to the professional sports team.

The professional sports team's coach then utilizes the information in formulating an individual player strategy. The point of the matter is that this one player and his/her profile was re-purposed, repackaged, and reused at a minimum by four different collective intelligence data profile gatherers. Thus, collective intelligence data stores are not always about profiling for financial gain or for the collection of information just for a marketplace gain.

Once the code is produced and re-purposed it can be redeployed for the quick development and deployment of other physical to virtual components such as the user manipulation software components for the virtual streaming "playground", or the virtual multimedia content handler. The data that is gathered or collected from the initial profile forms will be utilized to build or grow collective intelligence data stores which can be repurposed and utilized by other third parties.

Collective intelligence thus can be utilized and shared in an open and positive way for ongoing social learning. Nevertheless, the virtual profiles can be or then be re-purposed and reused for the collective intelligence that will result in a virtual database store that is then re-purposed into a mechanism for ongoing collective intelligence profiling and gathering on the virtual machine client servers.

Thus, global social networking can be initiated from one unique application. That is just one example of software re-purposed to take the physical model and transform it into a virtual instance by reusing software code and then re-bundling as a separate software application to produce other unique software components in the process. These elaborate technical components comprise a physical to virtual architecture and ultimately build the underlying subsystem architecture.

As an example, the hub can implement a "Profile Service" unique to the hub. Once the application logic and executable components are bundled as an application virtual appliance that make up the application template image determined at registration time, then the Profile Service will execute the specific services necessary for adding a specific user to a much larger community of a users. By assigning the user a unique ID for authentication to a particular community, the ID can also be used for other functions. Such as, to capture advanced logging data that would ensure optimal functioning of other system functions controlled by the handler.

The invention enables and introduces a primitive "utility services" of type in that a user only pays for or "rent" the necessary services actually needed, and the rest of the data warehouse infrastructure goes away.

In essence, the data is kept close to its user base. The data is also "distributed" in that it resides on a local physical user disk that associates to a particular domain community, for file sharing, and for data exchange exclusive of an offsite isolated data warehouse. But the data warehouse goes away, the virtual disk application environment is enabled, thus a new service oriented architecture is enabled, and the interconnected physical computer disks can run application(s) implemented as cloned virtual instances, solving the network latency problems by moving the content out of a data ware-house environment and as close to the user base as possible.

A clustered architecture as a hybrid network will be formed by the connection of individual computer disks. These interconnected physical disks make up the "isolated partitions" and not by hosted virtual machines by the means of a hypervisor. These functions are handled by the backend master client. Thus, individual user's and their respective physical machine disks will enable application instances to run from the isolated disks partitions that will form the basis of the domain communities. These disks will ultimately be grouped into domain server disks based on user profile roles, and will act as if they actually co-existed within a data-warehouse environment. The output to this reality is the enablement of a virtual thin desktop, based on virtual disk instances, allowing connecting machines without the need for a browser and so that data can be assessed readily as indicated. People can socially connect and share via the same protocols but without the browser.

The live streaming media and data communication hub implements a new file system structure for local multimedia storage as well as an integrated user database for rapid data retrieval. Once an RTOS is enabled, and once a particular user has registered, then that user will be automatically placed into a domain community based on the services he/she signed up for or "rented", and assigned a unique user id or key for authentication. Then, the appliance will execute the necessary components that will create a separate isolated partition on his/her local computer disk that will run the application instances and store the multi-media data. After the volume is created, it can then be attached to a "livestreaminghub" instance. Upon attachment, it will then appear as a mounted device similar to any hard drive or other disk "block" device, but without a drive letter assigned to the physical hard drive. The instance can interact with the volume as it would any other local drive by installing and storing multimedia data on it. A volume can be attached to only one "livestreaminghub" instance at a time, but many storage volumes can be attached to a single instance, which means multiple storage volumes can be attached that will strip user data across them for increased I/O and throughout performance. If a volume storage instance fails, then the "livestreaminghub" instance volume will be attached to another instance volume in his/her user pool or within the much larger interconnected pool of users.

The storage volumes can then be assessed over the internal network via an API. This may be regarded as an abstracted layer of storage as opposed to the storage device directly as the volume, it can easily be scaled out to the cloud to offset the load when an individual computer has taxed its resources. Thus, this unique load-balancer will act as a strategic control point and will provide a means to redirect requests to an external or internal cloud when its CPU or other resources are depleted. This also means that the interconnected communities will offset or handle a user disk load when necessary. This is a form of "cloudbursting". Additionally, the individual user data located in stores on a local volume will provide access to the data-store via a unique API.

Figure 7:
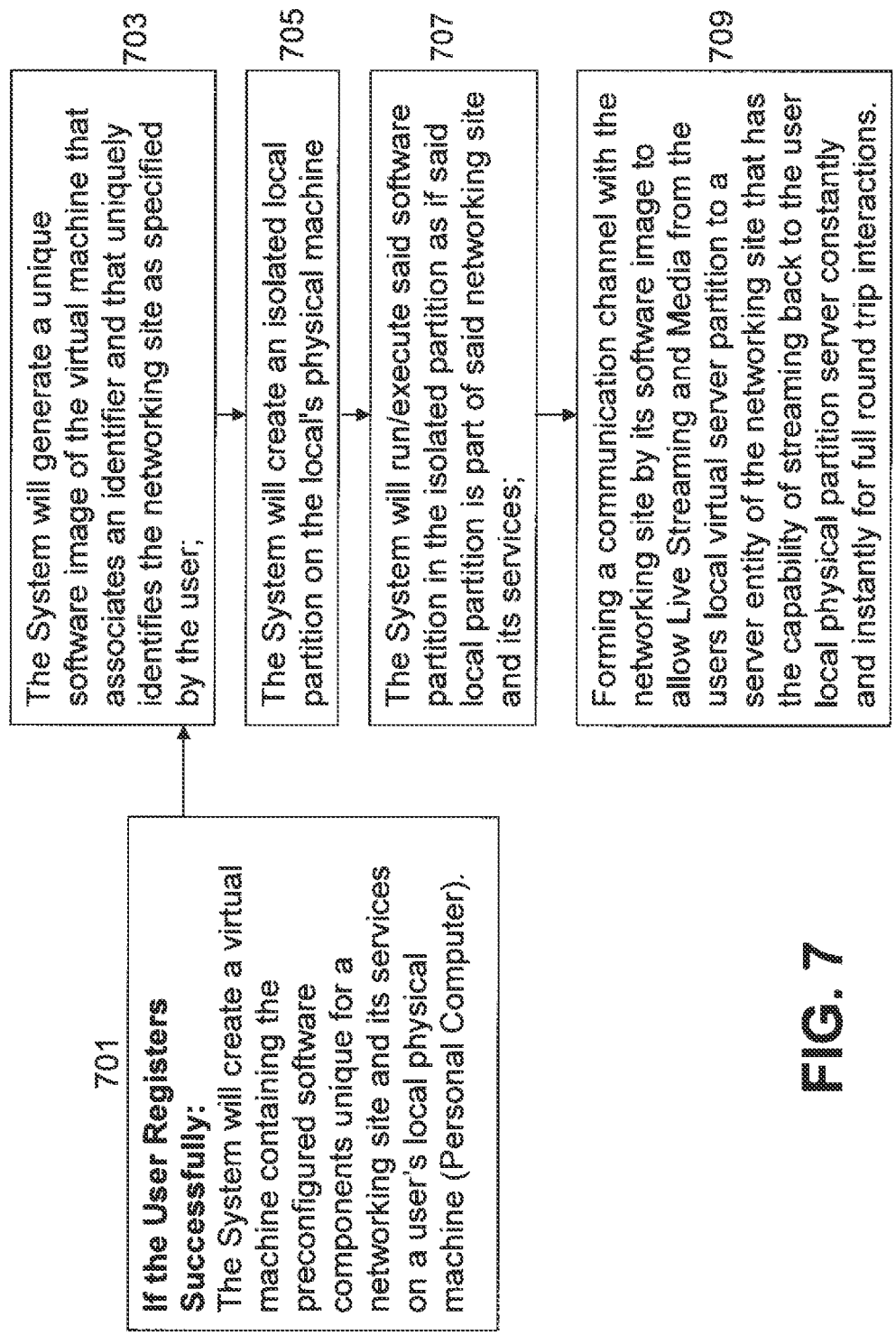
FIG. 7 schematically shows an example functional process for a distributed server system in accordance with this application.
Figure 8:
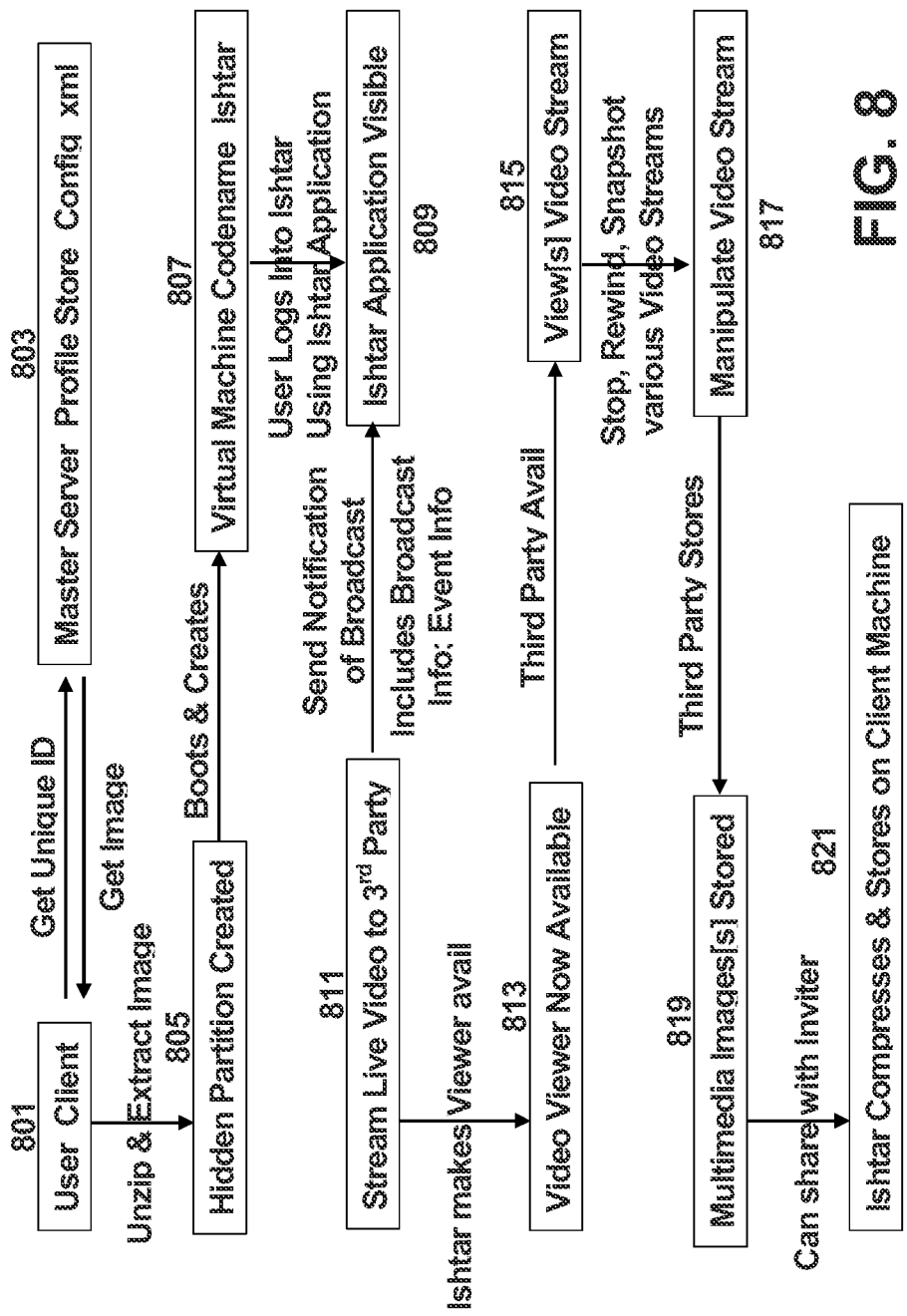
FIG. 8 schematically shows an example functional implementation for a distributed server system in accordance with this application.

The general process is embodied in FIGS. 7 and 8. A user is interested in the services of a network site A. At step 701, if the user registers successfully, the system will create a virtual machine containing the preconfigured software components unique for networking site A and its services on the user's local physical machine, i.e. a personal computer. At step 703, the system will generate a unique software image of the virtual machine that associates an identifier that uniquely identifies networking site A as specified by the user. At step 705, the system will create an isolated local partition on her/his local personal computer. At step 707, the system will run the software instances in the isolated partition as if the user's local partition is part of the networking site A server system. At step 709, a direct communication channel is formed between the local partition by the software image to allow Live Streaming and Media from the user's local virtual server partition to the server entity of network site A constantly and instantly for full round trip interactions.

FIG. 8 shows an example embodiment. A registered User at step 801 gets a unique ID from Master Server Profile Store at Step 803, possibly implemented with xml files, and downloads the software appliance image files to the user's local personal computer. The image files are unzipped and run on the local computer, and creates a hidden partition on the user's personal computer hard disk at Step 805. Running of the downloaded boots files then creates a Virtual Machine in the hidden partition space at Step 807. When the user logins into the Virtual Machine and activates the application instances, the Application becomes visible to the user and other people on the network at Step 809. The Application the sends notice to the network of broadcast and makes available stream live video to third parties on the network at Step 811. Interested third party viewers are made visible to the user at Step 813, and authorized third party is allowed to access and manipulate and store the user's streaming video on the local partition at Steps 815, 817 and 819. The user may share videos and files and comments with inviters and record and store the history at Step 821.

Figure 9:
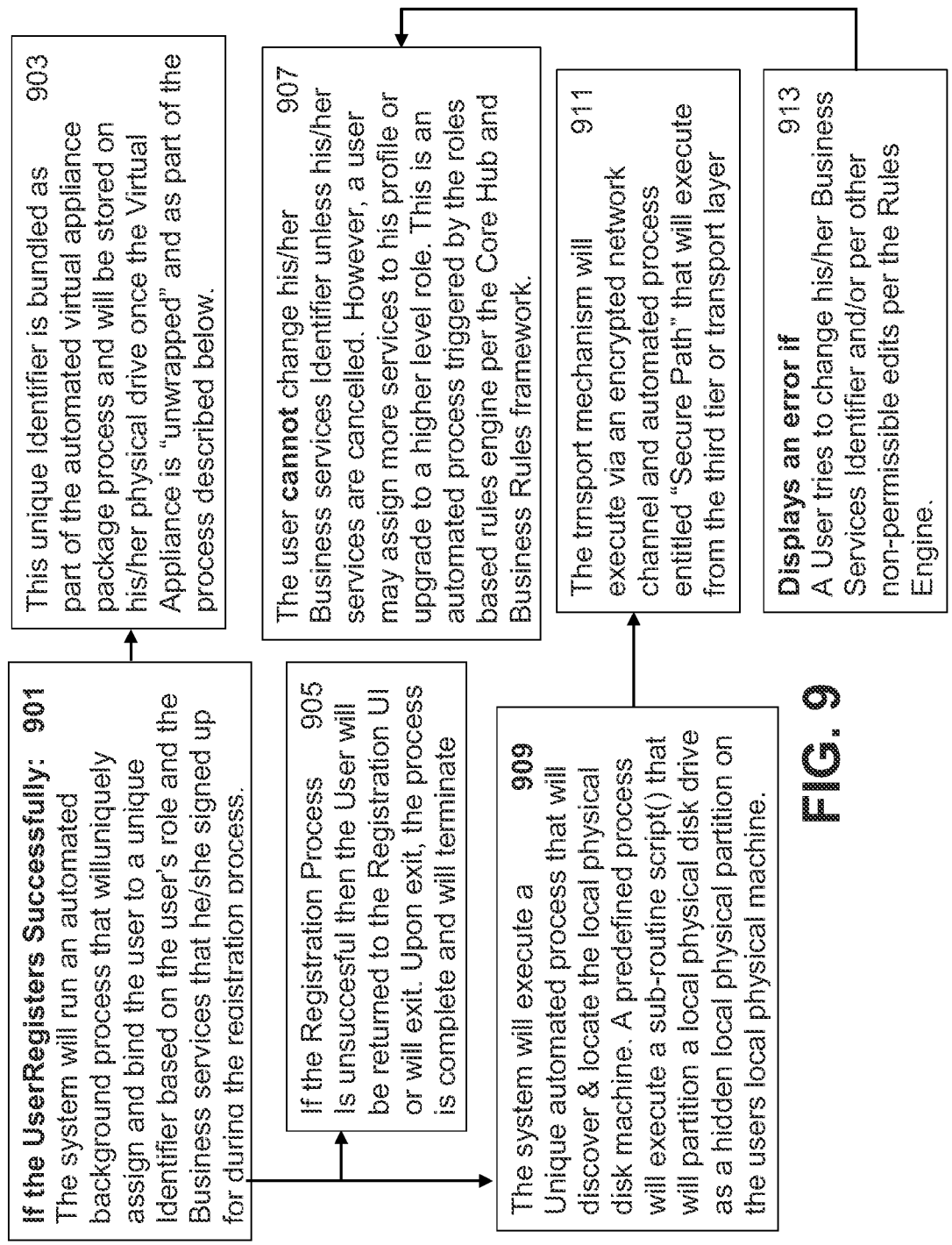
FIG. 9 schematically shows an example functional flow chart for setting up a distributed server system in accordance with this application.

FIG. 9 shows an embodiment for role based user management. At step 901, after a User successfully registered with the system, the system will run an automated background process that will uniquely assign and bind the user to a unique Identifier based on the user's role and the business services that he/she signed up for during the registration process. At step 905, if the Registration Process is unsuccessful then the User will be returned to the Registration UI or will exit. Upon exit, the process is complete and will terminate. Once activated at step 909, the system will execute a unique automated process that will discover & locate the local physical disk machine. A predefined process will execute a sub-routine script( ) that will partition a local physical disk drive as a hidden local physical partition on the users local physical machine. At step 911, the transport mechanism will execute via an encrypted network channel and automated process entitled "Secure Path" that will execute from the third tier or transport layer.

At the same time, at step 903, this Unique Identifier is bundled as part of the automated virtual appliance package process and will be stored on his/her physical drive once the Virtual Appliance is "unwrapped" and as part of the process. The user cannot change his/her business services Identifier unless his/her services are canceled. However, at step 907 the user can assign more services to his profile or upgrade to a higher level role. This is an automated process triggered by the roles based rules engine per the Core Hub and Business Rules framework.

Therefore this system imposes two subtypes of live streaming with two completely different sub-functions as follows: Subtype A with Sub-Function A: Streaming to and from a virtual desktop involves "Updates and Sniffers" to ensure integrity of the application. This function and its associated connection ports must remain open or open or close periodically. Subtype B with Sub-Function B involves live video streams out to the cloud/internet exclusive of a back-end server that has functions, such as a file server. Additionally, the connection port and all existing associated connections to the function must be closed when the video/multimedia stream finishes or per a set of associated rules based that is scenario based.

Different to a traditional web service, the profile association at Registration time is a totally separate function and involves a web-site solely for registration of an existing client or a returning client. The back-end master server client is a profile handler only and is based upon a model-view-control pattern to ensure profile integrity of each profile associated with a branded community. Thus, the function of this back-end computer client only asks for a duplicate and does not serve up nor retain any files within. Additionally, the master server backend will have additional functions and handle all other requests and direct them to the appropriate connection mechanism or ports. Instead, the whole idea encompasses specific API calls and relative connectivity to have a 100% virtualized application and social community architecture without the need for a file server. The established machine-to-machine connections in the social network has the ability to automate the provisioning of software, resolve data to an integrated database, as well as scale out to third party service providers, while offering global social interactions.

Figure 10:
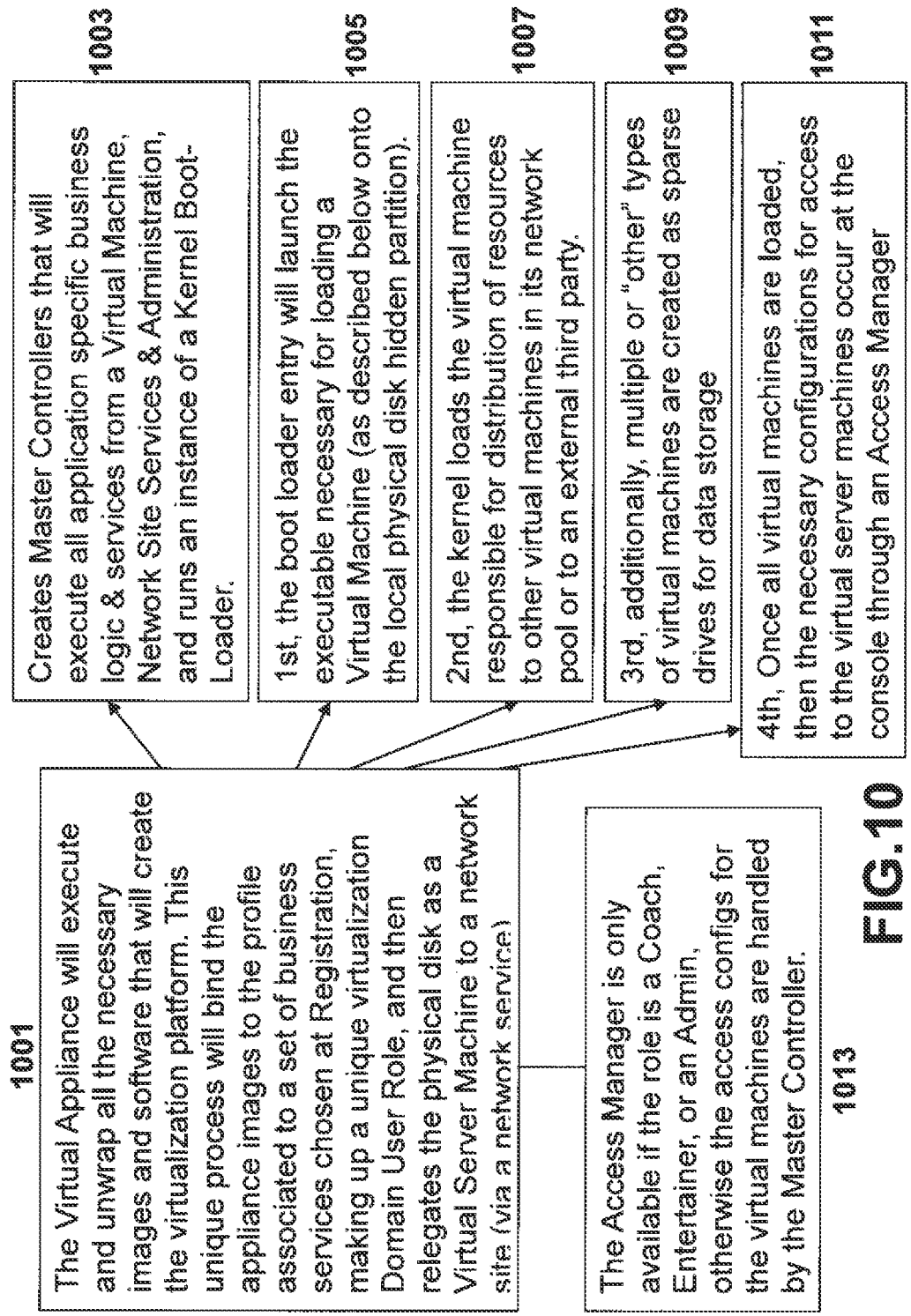
FIG. 10 schematically shows an example functional flow chart for performing a distributed server system in accordance with this application.

In reference to FIG. 10, in an example embodiment, at Step 1001, the Virtual Appliance will execute and unwrap all the necessary images and software that will create the virtualization platform. This unique process will bind the appliance images to the profile associated to a set of business services chosen at Registration, make up a unique virtualization Domain User Role, and relegate the physical disk as a Virtual Server Machine to a network site via a network service. At Step 1003, the Virtual Appliance creates Master Controllers that will execute all application specific business logic & services from a Virtual Machine, Network Site Services & Administration, and runs an instance of a Kernel Boot-Loader. At Step 1005, the boot loader entry will first launch the executable necessary for loading a Virtual Machine onto the local physical disk hidden partition. At step 1007, the kernel loads the virtual machine responsible for distribution of resources to other virtual machines in its network pool or to an external third party. At Step 1009, multiple or "other" types of virtual machines are created as sparse drives for data storage. At Step 1011, once all virtual machines have been loaded, the necessary configurations for access to the virtual server machines occur at the console through an Access Manager. The Access Manager may be set only available if the role is a Coach, Entertainer, or an Admin. Otherwise the access configurations for the virtual machines may be handled by the Master Controller.

Figure 11:
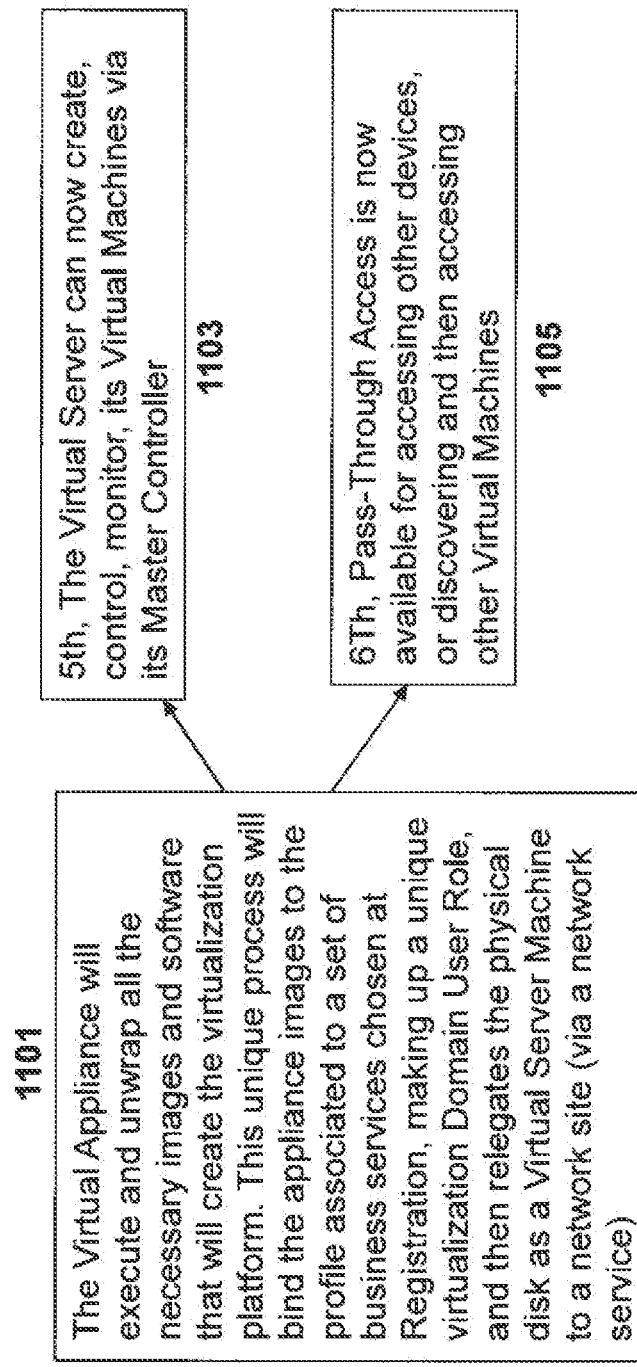
FIG. 11 schematically shows an example functional flow chart for performing a distributed server system in accordance with this application.

In reference to FIG. 11, at Step 1103, the Virtual Server will now create, control, monitor, its Virtual Machines via its Master Controller. At Step 1105, a Pass-Through Access is now available for accessing other devices, or discovering and then accessing other Virtual Machine.

Figure 12:
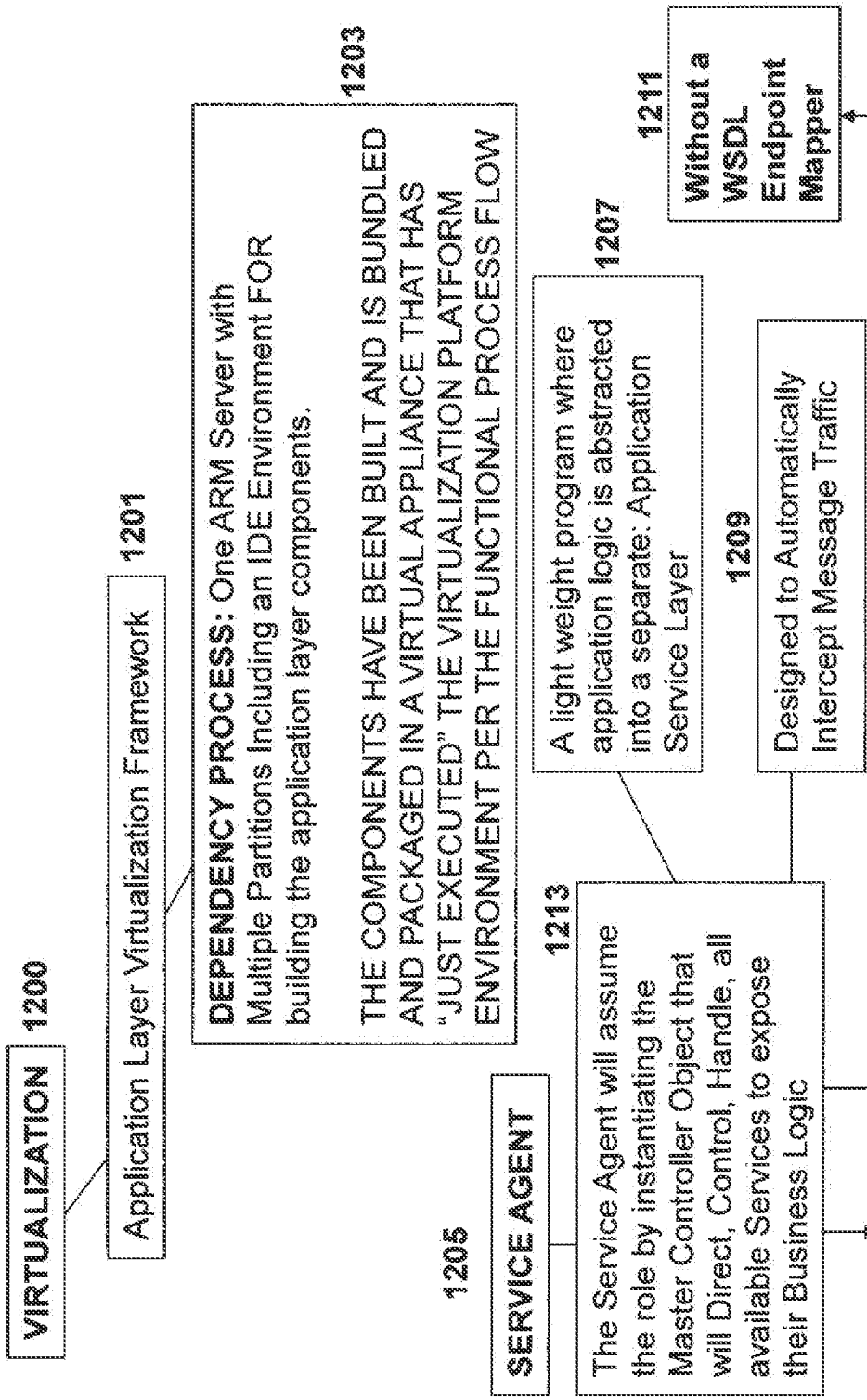
FIGS. 12-14 schematically shows an example set of structural components for virtualization of a distributed server system in accordance with this application.

In reference to FIG. 12, an example embodiment of virtualization 1200 includes an application layer virtualization framework 1201 that includes dependency process 1203, preferably One ARM Server with multiple partitions including an IDE Environment for building the application layer components. The components that are built and bundled and packaged in a Virtual Appliance are the instances that have "just executed" the virtualization platform environment per functional process flow.

Service Agent 1205, for example, a light weight program where application logic is abstracted into a separate Application Service Layer as shown in 1207, assumes the role by instantiating the Master Controller Object that directs, controls, handles all available Services to expose their Business Logics as shown in block 1203. The Service agent is preferably designed to automatically intercept message traffic at Step 1209.

Figure 13:
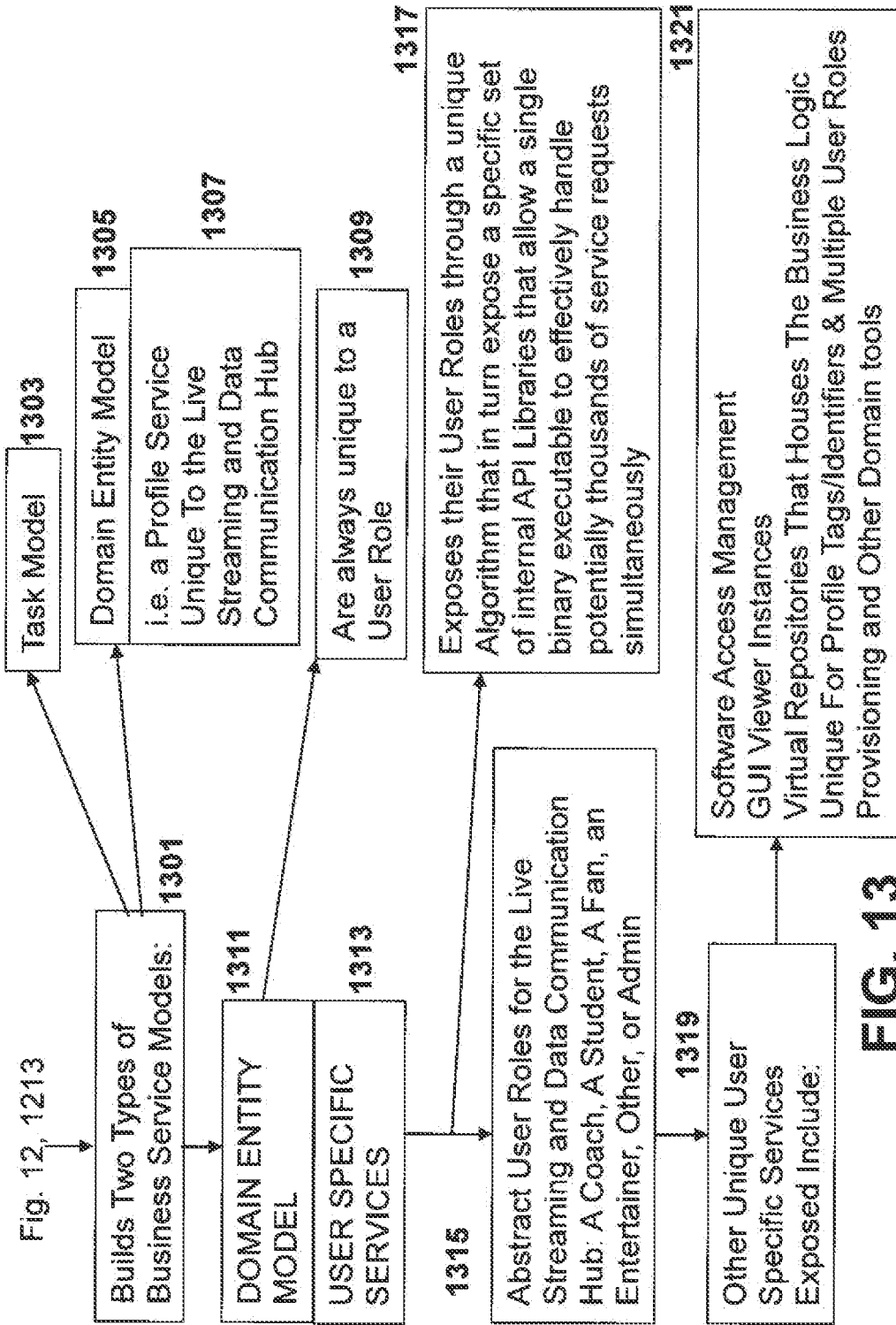

In reference to FIG. 13, two types of Business Service Models are used in parallel for step 1301. Task Model route 1303 is built to handle the general tasks of the processes; Domain Entity Model route 1307 is built to handle profile services related with any particular user. Profile Services unique to the live streaming and data communication hub may be managed by module 1307. User role-related services may be assigned and managed by modules 1309, 1311 and 1313. For example, abstract User Roles for the Live Streaming and Data Communication Hub: A Coach, A Student, A Fan, An Entertainer, Other, or Admin may be assigned at step 1315 and at steps 1319, 1321 other Unique User Specific Services may be associated, include: Software Access Management GUI Viewer Instances Virtual Repositories That Houses The Business Logic Unique For Profile Tags/Identifiers & Multiple User Roles Provisioning and Other Domain tools. User Roles may be determined at step 1317 through a unique Algorithm that in turn expose a specific set of internal API Libraries that allow a single binary executable to effectively handle potentially thousands of service requests simultaneously.

Figure 14:
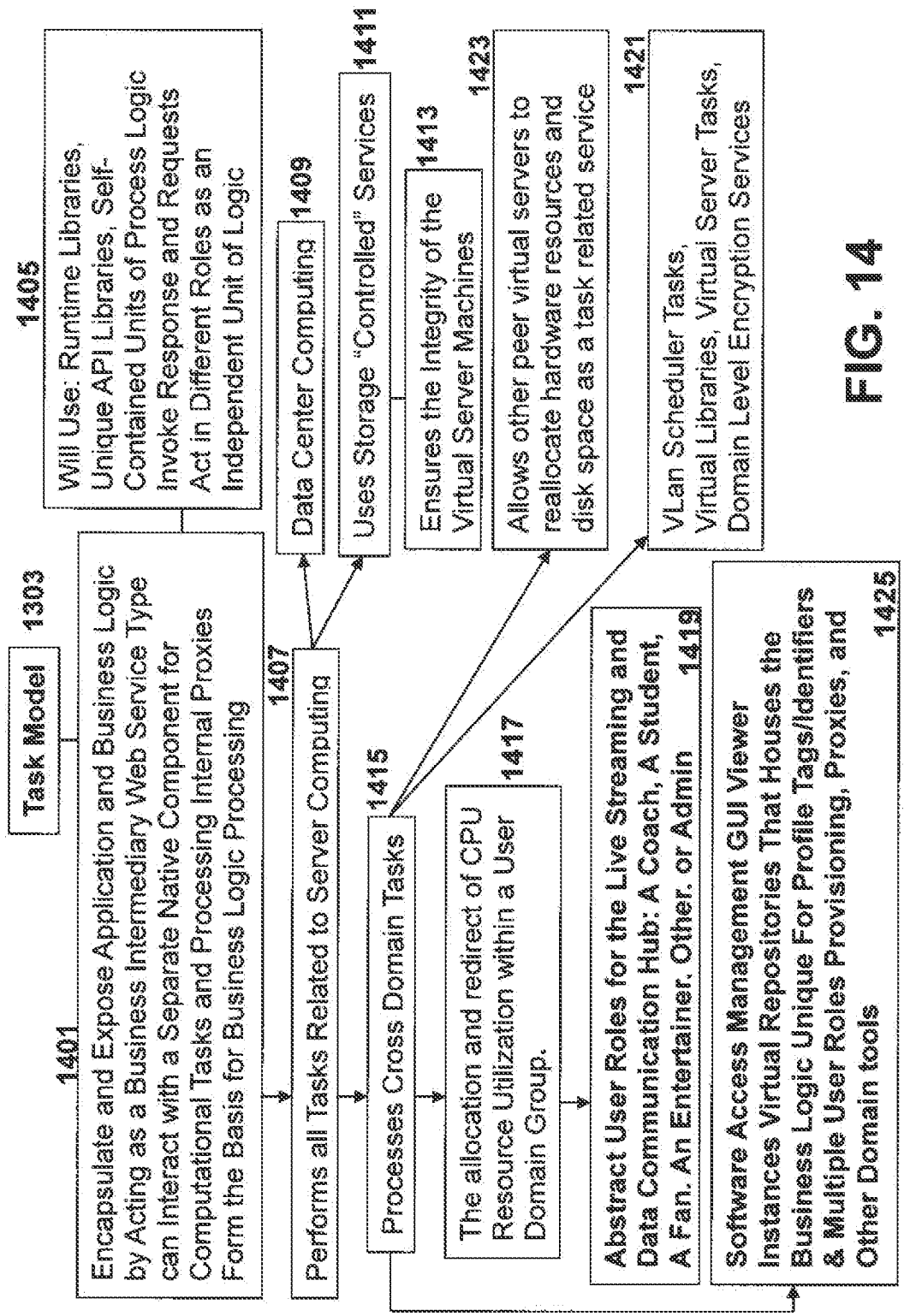

In reference to FIG. 14, step 1401, service agents are implemented to encapsulate and expose Application and Business Logic by acting as a business intermediary web service type that can also interact with a separate native component for computational tasks and processing internal proxies, forming the basis for business logic processing. As shown at step 1405, the agents may use runtime libraries, unique API libraries, self contained units of process logic invoke response and requests act in different roles as an independent unit of logic. The agents may be constructed to perform specific tasks. Tasks include: server computing 1407, data center computing 1409, storage "controlled" services 1411, ensuring the integrity of the Virtual Server Machines 1413. Server Computing 1407 may call on Cross domain process 1415 that may include: allowing other peer virtual servers to reallocate hardware resources and disk space 1423, and VLan scheduler tasks, virtual libraries, virtual server tasks, domain level encryption services 1421. Cross domain process 1415 may call on step 1417 for the allocation and redirection of CPU Resource Utilization within a User Domain Group. Step 1417 may call on Step 1419 to allow abstract User Roles for the Live Streaming and Data Communication Hub: A Coach, A Student, A Fan, An Entertainer, Other, or Admin. Step 1415 for Cross Domain process can call on step 1425 for Software Access Management GUI Viewer Instances, Virtual Repositories that Houses the Business Logic Unique For Profile Tags/Identifiers and Multiple User Roles Provisioning, Proxies, and Other Domain tools.

The role based and integrated tool-set Virtual Appliance will provide all the components for allowing a public broadcast; a user can publish to and from his/her own live network channel via an integrated live broadcast virtual network channel or can convert his/her own live channel into a service network instead of a local client environment. Thus, this will allow a user the option of streaming live as would a television station; therefore allowing the profile user to bypass live streaming to a third party web server.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The new and novel instances will also have a unique automated and interactive interface for bundling, downloading, and installing the executable program(s). The virtualization aspects only act as a software handler for full software cooperation, but when coupled with the new automated virtual interface controls and software code will produce a brand new virtual file and storage handler that will be re-purposed for multiple roles. This will allow for not only full file bundling and execution, but for all communications to and from other virtual machines, across multiple shared virtual machine disks, and will also enable the separation of the application from the underlying operating system and its resources.

Virtual Desktop Infrastructure and Design provides a unique coupling that will produce new application/client level software virtualization instances and that when deployed with the other software virtualization instances of type will allow the separation and decoupling of the physical machines into new virtual machine instances. It allows a user to have their own desktop without physically attaching to the operating system resources.

One Master Host Client Machine will house the initial registration profile information as well as the initiator of the communications between the controller and the virtual web services on the client server machines. A "Hybrid Server Virtualization" that extends this virtual application server component by developing and inventing a new set of protocols and interfaces for the master host server machine.

A Virtual Device Manager component software virtualization extends the hardware emulation software virtualization as well as the hybrid server virtualization that we are going to uniquely develop and as mentioned above. This virtual component will contain a set of proprietary and key libraries that can interact with the other virtual component architecture bits (as mentioned in this document). A virtual device manager, a virtual device profiler is implemented to sniff, profile, and examine the present hardware devices as well as on-going maintenance of future hardware devices within the invention architecture's boundaries. This component also contain a virtual device monitor that profiles, examines, and reacts accordingly. This component virtual device manager is built upon a hardware emulation framework that extends the virtual machine instances and any other potential "third party web hosting pieces" for live video streaming to third parties. The idea is build upon the operating system level virtualization in the fact that it gives an "illusion" to others as if it is running on a machine dedicated to its usage.

User functionality and its relative architectural components are implemented for a "Live Virtual TV and Radio Component". The initial idea extends upon the physical transformation by building "Live Video Web Services" into a "Live Virtual TV and Radio Component" through the enablement of one's own website page within the Virtual Desktop Infrastructure virtual instances for capturing, manipulating, and then storing that data as part of the infrastructure and architecture. Thus, the user would have the ability to do his/her own live audio performances as well as record live event audio recording and video streams that runs in his/her own virtual desktop instance by enabling a virtual website instance from the virtual desktop. However, the idea also includes and extends this user functionality by providing a gateway for also progressively streaming "live" to third parties that may or may not utilize a third party web host.

Automated interfaces capture and associate interface devices, protocols, processes, and methods to enable a live progressive video stream that has the capacity to be captured by a live TV channel and as encapsulated web services captured in a virtual machine device for the enablement of the "Virtual TV and Radio Component" as part of the hub architecture.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for establishing an adaptive electronic server computing network system, comprising:
   providing a computer processor for executing a Backend Master Client system on a central computer, said Backend Master Client system having a static data store for storing a user account and a plurality of configuration and application systems fom a physical server to a virtual server transformation for a network service;
   providing a computer processor for executing a user registration system allowing a user to establish a user account on said Backend Master Client system and set up a role-oriented user profile and to sign up for said network service;
   providing a computer processor for executing a Master Controller system comprising a Just Enough Operating System domain for each registered user to said network service a UI template generated by the IDE with an integrated rule set for a local physical disk server machine, and a UI interface framework that dynamically binds a profile to a virtual domain via its Model View Controller framework, including a Virtual Appliance Controller unit that dynamically defines how a user will interact with a Virtual Appliance functional unit or its Model, wherein said Master Controller builds a Virtual Appliance Platform Framework about said network service on a local computer server disk machine of said user upon said user's successful registration and said Just Enough Operating System is configured according to a real time event task provided by a user;
   providing a computer processor for establishing a machine-to-machine communication channel between said Virtual Appliance Platform and for securely connecting and collaborating with other users of said social computing server system of said network service; and
   providing a computer processor for real-time live streaming of interested data with another social community user via said Virtual Appliance Platform and said server system of said network service.

2. The method of claim 1, wherein said user is enabled to sign up a plurality of network services simultaneously.

3. The method of claim 1, wherein said user is associated with a unique user ID upon registration, said user ID is used for building said Virtual Appliance Platform.

4. The method of claim 1, wherein said Virtual Appliance Platform is built in a hidden isolated local partitioned area on said local computer of said user.

5. The method of claim 1, wherein said Backend Master Client system is an one arm server with multiple partitions including an IDE environment.

6. The method of claim 1, wherein said Virtual Appliance Platform is built by bundling a group of components comprising a Just Enough Operating System, a database, a rule engine, Virtual Desktop Infrastructure and instances of an executable application system of said network service downloaded from said Backend Master Client system.

7. The method of claim 1, wherein said interested data is stored on said local computer of said user.

8. The method of claim 1, wherein said interested data is registered with said server of said network service once streamed and is searchable.

9. The method of claim 1, wherein said user account is attached to an intelligence store that stores said user's network activities categorized with said user's profile.

10. The method of claim 9, wherein said intelligence store is re-packaged and repurposed for another use.

11. An adaptive electronic distributed server computing network system, comprising several distributed computing and application layers over a distributed system including:
   a Backend Master Client system providing a computer processor for executing on a central computing device that has been transitioned from a server to client for a second physical transformation; and providing one-to-many Virtual Application Platform Client to Server Transformations of computer said Backend Master Client system said Backend Master Client system also having a static registration data set as a one-time original profile document store for an original user account snapshot established upon successful Registration of a User; and providing an Integrated Development Environment (IDE) for a physical development environment where "developers" will create a plurality of configuration and application profile user virtual appliances with container components for hand-off to its Backend Master Controller for establishing a virtual server system transformation of a network service;
   a user registration system allowing a user to establish a user account from said Backend Master Client system via a web-based interface triggered by a user and to set up and establish a role-oriented profile as a prerequisite for said Virtual Appliance network service;
   a Master Controller system comprising a Just Enough Operating System domain for each registered user to a said network service; a user interface (UI) template generated by its Integrated Development Environment (IDE) that builds an integrated rule set unique for a profile of type and for each local physical disk server machines; a user interface (UI) and widget framework that dynamically binds a profile to the virtual domain via its Model View Controller framework, providing a Virtual Appliance Controller unit that dynamically defines how a user will interact with the Virtual Appliance and its container of functional units; its Model, wherein said Master Client builds the Registration Unit that has a one-off profile build hand-off to its Backend Master Controller, wherein said Backend Master Controller, in turn, builds the initial Virtual Appliance Platform about said network service on a local computer server disk machine of said user upon said user's successful registration; with a Just Enough Operating System configured according to a real time event tasks provided by a user; and said Just Enough Operating System is configured according to a real time event task provided by a user; establishing a machine-to-machine communication channel between said Virtual Appliance Platform with a server system of said network service.

12. The adaptive electronic server computing network system of claim 11, wherein said user is enabled to sign up a plurality of network services simultaneously.

13. The adaptive electronic server computing network system of claim 11, wherein said user is associated with a unique user ID upon registration, said user ID is used for building said Virtual Appliance Platform.

14. The adaptive electronic server computing network system of claim 11, wherein said Virtual Appliance Platform is built in a hidden isolated local partitioned area on said local computer of said user.

15. The adaptive electronic server computing network system of claim 11, wherein said Backend Master Client system is an one arm server with multiple partitions including an IDE environment.

16. The adaptive electronic server computing network system of claim 11, wherein said Virtual Appliance Platform is built by bundling a group of components comprising a Just Enough Operating System, a database, a rule engine, Virtual Desktop Infrastructure and instances of an executable application system of said network service downloaded from said Backend Master Client system.

17. The adaptive electronic server computing network system of claim 11, wherein said interested data is stored on said local computer of said user.

18. The adaptive electronic server computing network system of claim 11, wherein an interested data is streamed through said communication channel and is registered with said server of said network service once streamed and is searchable.

19. The adaptive electronic server computing network system of claim 11, wherein said user account is attached to an intelligence store that stores said user's network activities categorized with said user's profile.

20. The adaptive electronic server computing network system of claim 19, wherein said intelligence store is re-packaged and repurposed for another use.

* * * * *